United States Patent
Drazic et al.

(10) Patent No.: US 12,306,405 B2
(45) Date of Patent: May 20, 2025

(54) WAVEGUIDE DISPLAY WITH CROSS-POLARIZED EYE PUPIL EXPANDERS

(71) Applicant: INTERDIGITAL CE PATENT HOLDINGS, SAS, Paris (FR)

(72) Inventors: Valter Drazic, Betton (FR); Oksana Shramkova, Liffré (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 288 days.

(21) Appl. No.: 17/916,498

(22) PCT Filed: Apr. 1, 2021

(86) PCT No.: PCT/EP2021/058583
§ 371 (c)(1),
(2) Date: Sep. 30, 2022

(87) PCT Pub. No.: WO2021/204656
PCT Pub. Date: Oct. 14, 2021

(65) Prior Publication Data
US 2023/0176382 A1    Jun. 8, 2023

(30) Foreign Application Priority Data
Apr. 6, 2020  (EP) .................................... 20315121

(51) Int. Cl.
*G02B 27/01*  (2006.01)
*F21V 8/00*   (2006.01)
(52) U.S. Cl.
CPC ....... *G02B 27/0172* (2013.01); *G02B 6/0036* (2013.01); *G02B 6/0056* (2013.01); *G02B 2027/0123* (2013.01)

(58) Field of Classification Search
CPC ................ G02B 6/0036; G02B 6/0056; G02B 27/0172; G02B 27/1086; G02B 27/283; G02B 2027/0123
See application file for complete search history.

(56) References Cited

U.S. PATENT DOCUMENTS

2018/0113309 A1   4/2018  Robbins
2021/0064082 A1*  3/2021  Yang ..................... G02B 27/283

FOREIGN PATENT DOCUMENTS

CN   110471185 A   11/2019
EP    3671293      6/2020
(Continued)

OTHER PUBLICATIONS

Cakmakci, O. et al., "Head-worn displays: a review." Journal of display technology vol. 2, No. Sep. 3, 2006, pp. 199-216 (18 pages).
(Continued)

*Primary Examiner* — Michael P Mooney
(74) *Attorney, Agent, or Firm* — Klintworth & Rozenblat IP LLP

(57) ABSTRACT

Embodiments include an optical system that may be included in a waveguide display. An example apparatus includes an image generator configured to generate an image having an upper portion and a lower portion. A waveguide is provided with an in-coupler and an out-coupler, the in-coupler being arranged to couple the upper and lower portions of the image along an optical path to the out-coupler. Along the optical path, at least first and second polarization-selective diffraction gratings are configured to cooperatively direct the upper portion of the image toward the out-coupler. At least third and fourth polarization-selective diffraction gratings are configured to cooperatively direct the lower portion of the image toward the out-coupler.

14 Claims, 16 Drawing Sheets

(56) References Cited

FOREIGN PATENT DOCUMENTS

| WO | 2017180403 | 10/2017 |
|---|---|---|
| WO | 2019185977 A1 | 10/2019 |
| WO | 2019237051 A1 | 12/2019 |

OTHER PUBLICATIONS

Rolland, J. et al., "Head-Mounted Display Systems." Encyclopedia Of Optical Engineering, 2005 pp. 1-14 (14 pages).
Rolland, J. et al., "Head-worn displays: the future through new eyes." Optics and Photonics News, Apr. 2009, pp. 20-27 (8 pages).
Wikipedia "Optical head-mounted display" retrieved from https://en.wikipedia.org/wiki/Optical_head-mounted_display last accessed Aug. 11, 2023 (6 pages).
International Search Report and Written Opinion for PCT/EP2021/058583 dated Jun. 25, 2021 (14 pages).
International Preliminary Report on Patentability for PCT/EP2021/058583 mailed Oct. 6, 2022 (8 pages).
Eisen, L., et al., "Total internal reflection diffraction grating in conical mounting." Optics communications 261, No. 1, 2006, pp. 13-18 (6 pages).
Shi, Z. et al., "Wide field-of-view waveguide displays enabled by polarization-dependent metagratings." In Digital optics for immersive displays, vol. 10676, SPIE, 2018 (7 pages).

* cited by examiner

WAVEGUIDE DISPLAY WITH CROSS-POLARIZED EYE PUPIL EXPANDERS

CROSS-REFERENCE TO RELATED APPLICATIONS

The present application is a national stage application under 35 U.S.C. § 371 of International Application No. PCT/EP2021/058583, entitled "WAVEGUIDE DISPLAY WITH CROSS-POLARIZED EYE PUPIL EXPANDERS," filed on Apr. 1, 2021, which claims priority of European patent application no. 20315121.2, entitled "Waveguide Display With Cross-Polarized Eye Pupil Expanders," filed 6 Apr. 2020, which are hereby incorporated by reference in their entirety.

BACKGROUND

The present disclosure relates to the field of optics and photonics, and more specifically to optical device comprising at least one diffraction grating. It may find applications in the field of conformable and wearable optics (e.g. AR/VR glasses (Augmented Reality/Virtual Reality)), as well as in a variety of other electronic consumer products comprising displays and/or lightweight imaging systems, including head up displays (HUD), as for example in the automotive industry.

This section is intended to introduce the reader to various aspects of art, which may be related to various aspects of the present disclosure that are described and/or claimed below. This discussion is believed to be helpful in providing the reader with background information to facilitate a better understanding of the various aspects of the systems and methods described herein. Accordingly, it should be understood that these statements are to be read in this light, and not as admissions of prior art.

AR/VR glasses are under consideration for a new generation of human-machine interface. Development of AR/VR glasses (and more generally eyewear electronic devices) is associated with a number of challenges, including reduction of size and weight of such devices as well as improvement of the image quality (in terms of contrast, field of view, color depth, etc.) that should be realistic enough to enable a truly immersive user experience.

The tradeoff between the image quality and physical size of the optical components motivates research into ultra-compact optical components that can be used as building blocks for more complex optical systems, such as AR/VR glasses. It is desirable for such optical components to be easy to fabricate and replicate.

In such AR/VR glasses, various types of refractive and diffractive lenses and beam-forming components are used to guide the light from a micro-display or a projector towards the human eye, allowing forming a virtual image that is superimposed with an image of the physical world seen with a naked eye (in case of AR glasses) or captured by a camera (in case of VR glasses).

Some of kinds of AR/VR glasses utilize an optical waveguide wherein light propagates into the optical waveguide by TIR (for Total Internal Reflection) only over a limited range of internal angles. The FoV (for Field of View) of the waveguide depends on the material of the waveguide, among other factors.

For instance, in WO2017180403, a waveguide with an extended field of view is proposed wherein a dual mode image propagation is used. In WO2017180403, combining both half images is done thanks to the pupil expanders and out-couplers at the exit of the waveguide so that the user sees one single image. The goal of the system is to double the field of view since each half image can use the whole angular bandwidth of the waveguide in each direction of propagation.

In EP18215212.4 ("An optical device comprising at least one diffraction grating having a grating pitch above the wavelength", O. Shramkova, V. Drazic), an optical waveguide comprising a diffraction grating configured to diffract a light of at least one given wavelength incident on the optical waveguide is disclosed. The diffraction grating has a grating pitch above the at least one given wavelength and is configured to diffract the incident light at a diffraction order |M|>1, with M being the diffraction order.

Using diffraction orders higher than 1 has the effect of multiplying the wavelength by the diffraction order that is used in the diffraction equation. As the grating pitch is directly a function of the product $M\lambda$, this means that the grating pitch is multiplied by M. It was shown in EP18215212.4, that the structures used for the in-coupler are much bigger and opens up new possibilities in the fabrication technology, because nano-imprinting could be used. The grating density with fewer lines per millimeter can be used, and the fabrication process can be simplified by using over-wavelength structures rather than sub-wavelength.

It was also shown in EP18215212.4 that such an optical waveguide using both ±2 diffraction orders provides a FoV of about 60° with a refractive index of 1.5. It is thus possible to get a 60° field of view using a material with refractive index 1.5, instead of 2 in single mode.

However, a 60° FoV is still limited with respect to the total human field of view where stereopsis is effective for human vision and which is about 114°.

Waveguide-based AR/VR glasses can exhibit a wide field of view along one direction (e.g. in a horizontal direction) but may have a narrower field of view along another direction (e.g. in a vertical direction). However, because AR/VR applications generally call for particular aspect ratios, a limitation of the field of view along one direction may, for practical purposes, effectively limit the field of view along the other direction.

SUMMARY

References in the specification to "one embodiment," "an embodiment," "an example embodiment," and the like indicate that the embodiment described may include a particular feature, structure, or characteristic; but not every embodiment necessarily includes that particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described.

An apparatus according to some embodiments includes a waveguide having an in-coupler (206) and an out-coupler; a first diffraction grating and a second diffraction grating along a first optical path from the in-coupler to the out-coupler, wherein the first and second diffraction gratings have a greater diffraction efficiency for light having a first polarization state than for light having a second polarization state complementary to the first polarization state; and a third diffraction grating and a fourth diffraction grating along the first optical path, wherein the third and fourth diffraction gratings have a greater diffraction efficiency for light having the second polarization state than for light having the first polarization state complementary to the first polarization state.

In some embodiments, the apparatus further includes an image generator configured to generate an image having an upper portion and a lower portion, the in-coupler being arranged to couple the upper and lower portions of the image into the waveguide; wherein the first and second diffraction gratings are configured to cooperatively direct the upper portion of the image toward the out-coupler, and the third and fourth diffraction gratings are configured to cooperatively direct the lower portion of the image toward the out-coupler.

In some embodiments, the apparatus further includes an image generator configured to generate an image having a left portion and a right portion, the left portion including an upper-left quadrant and a lower-left quadrant, the right portion including an upper-right quadrant and a lower-right quadrant; wherein the in-coupler is arranged to couple the left portion of the image along the first optical path to the out-coupler and to couple the right portion of the image along a second optical path to the out-coupler; wherein the first and second diffraction gratings are configured to cooperatively direct the upper-left quadrant toward the out-coupler, and the third and fourth diffraction gratings are configured to cooperatively direct the lower-left quadrant toward the out-coupler. In some such embodiments, the apparatus further includes a fifth diffraction grating and a sixth diffraction grating along the second optical path, wherein the fifth and sixth diffraction gratings have a greater diffraction efficiency for light having the first polarization state than for light having the second polarization state, the fifth and sixth diffraction gratings being configured to cooperatively direct the upper-right quadrant toward the out-coupler; and a seventh diffraction grating and an eighth diffraction grating along the second optical path, wherein the seventh and eighth diffraction gratings have a greater diffraction efficiency for light having the second polarization state than for light having the first polarization state, the seventh and eighth diffraction gratings being configured to cooperatively direct the lower-right quadrant toward the out-coupler.

In some embodiments of the apparatus, the first polarization state is one of p-polarization and s-polarization and the second polarization state is the other of p-polarization and s-polarization.

In some embodiments, the first and third diffraction gratings are arranged in at least partially overlapping positions on opposite surfaces of the waveguide.

In some embodiments, the second and fourth diffraction gratings are arranged in at least partially overlapping positions on opposite surfaces of the waveguide.

In some embodiments, the first and second diffraction gratings have a first grating period and the third and fourth diffraction gratings have a second grating period different from the first grating period.

In some embodiments, the image generator is operative to generate an image with unpolarized light.

A method according to some embodiments includes: generating an image; coupling the image into a waveguide using an in-coupler of the waveguide; directing a first portion of the image along a first optical path from the in-coupler of the waveguide to an out-coupler of the waveguide using at least a first and a second diffraction grating, wherein the first and second diffraction gratings have a greater diffraction efficiency for light having a first polarization state than for light having a second polarization state complementary to the first polarization state; and directing a second portion of the image along the first optical path from the in-coupler of the waveguide to the out-coupler of the waveguide using at least a third and a fourth diffraction grating, wherein the third and fourth diffraction gratings have a greater diffraction efficiency for light having the second polarization state than for light having the first polarization state.

In some embodiments, the first portion of the image is an upper portion of the image and the second portion of the image is a lower portion of the image.

In some embodiments, the method further includes directing a third portion of the image along a second optical path from the in-coupler of the waveguide to an out-coupler of the waveguide using at least a fifth and a sixth diffraction grating, wherein the fifth and sixth diffraction gratings have a greater diffraction efficiency for light having the first polarization state than for light having the second polarization state; and directing a fourth portion of the image along the second optical path from the in-coupler of the waveguide to the out-coupler of the waveguide using at least a seventh and an eighth diffraction grating, wherein the seventh and eighth diffraction gratings have a greater diffraction efficiency for light having the second polarization state than for light having the first polarization state.

In some embodiments of the method, the first polarization state is one of p-polarization and s-polarization and the second polarization state is the other of p-polarization and s-polarization.

In some embodiments of the method, the first and third diffraction gratings are arranged in at least partially overlapping positions on opposite surfaces of the waveguide.

In some embodiments of the method, the first and second diffraction gratings have a first grating period and the third and fourth diffraction gratings have a second grating period different from the first grating period.

In some embodiments of method, the image is generated with unpolarized light.

DETAILED DESCRIPTION

Figure 1A:
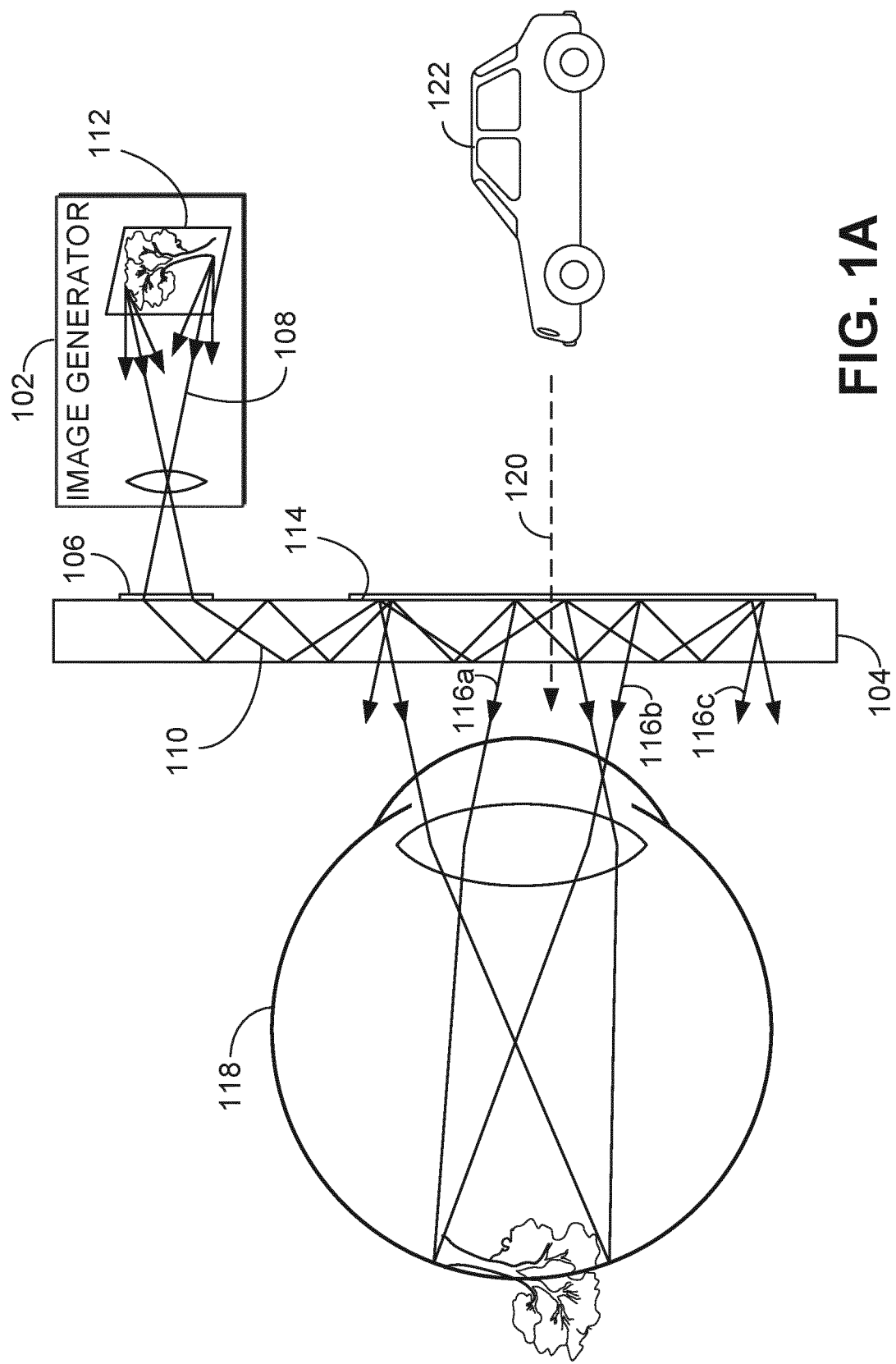
FIG. 1A is a cross-sectional schematic view of a waveguide display.

Described herein are waveguide display systems and methods. An example waveguide display device is illustrated in FIG. 1A. FIG. 1A is a schematic cross-sectional side view of a waveguide display device in operation. An image is projected by an image generator 102. The image generator 102 may use one or more of various techniques for projecting an image. For example, the image generator 102 may be a laser beam scanning (LBS) projector, a liquid crystal display (LCD), a light-emitting diode (LED) display (including an organic LED (OLED) or micro LED (µLED) display), a digital light processor (DLP), a liquid crystal on silicon (LCoS) display, or other type of image generator or light engine.

Light representing an image 112 generated by the image generator 102 is coupled into a waveguide 104 by a diffractive in-coupler 106. The in-coupler 106 diffracts the light representing the image 112 into one or more diffractive orders. For example, light ray 108, which is one of the light rays representing a portion of the bottom of the image, is diffracted by the in-coupler 106, and one of the diffracted orders 110 (e.g. the second order) is at an angle that is capable of being propagated through the waveguide 104 by total internal reflection.

At least a portion of the light 110 that has been coupled into the waveguide 104 by the diffractive in-coupler 106 is coupled out of the waveguide by a diffractive out-coupler 114. At least some of the light coupled out of the waveguide 104 replicates the incident angle of light coupled into the waveguide. For example, in the illustration, out-coupled light rays 116a, 116b, and 116c replicate the angle of the in-coupled light ray 108. Because light exiting the out-coupler replicates the directions of light that entered the in-coupler, the waveguide substantially replicates the original image 112. A users eye 118 can focus on the replicated image.

In the example of FIG. 1A, the out-coupler 114 out-couples only a portion of the light with each reflection allowing a single input beam (such as beam 108) to generate multiple parallel output beams (such as beams 116a, 116b, and 116c). In this way, at least some of the light originating from each portion of the image is likely to reach the user's eye even if the eye is not perfectly aligned with the center of the out-coupler. For example, if the eye 118 were to move downward, beam 116c may enter the eye even if beams 116a and 116b do not, so the user can still perceive the bottom of the image 112 despite the shift in position. The out-coupler 114 thus operates in part as an exit pupil expander in the vertical direction. The waveguide may also include one or more additional exit pupil expanders (not shown in FIG. 1A) to expand the exit pupil in the horizontal direction.

In some embodiments, the waveguide 104 is at least partly transparent with respect to light originating outside the waveguide display. For example, at least some of the light 120 from real-world objects (such as object 122) traverses the waveguide 104, allowing the user to see the real-world objects while using the waveguide display. As light 120 from real-world objects also goes through the diffraction grating 114, there will be multiple diffraction orders and hence multiple images. To minimize the visibility of multiple images, it is desirable for the diffraction order zero (no deviation by 114) to have a great diffraction efficiency for light 120 and order zero, while higher diffraction orders are lower in energy. Thus, in addition to expanding and out-coupling the virtual image, the out-coupler 114 is preferably configured to let through the zero order of the real image. In such embodiments, images displayed by the waveguide display may appear to be superimposed on the real world.

In some embodiments, as described in further detail below, a waveguide display includes more than one waveguide layer. Each waveguide layer may be configured to preferentially convey light with a particular range of wavelengths and/or incident angles from the image generator to the viewer.

Figure 1B:
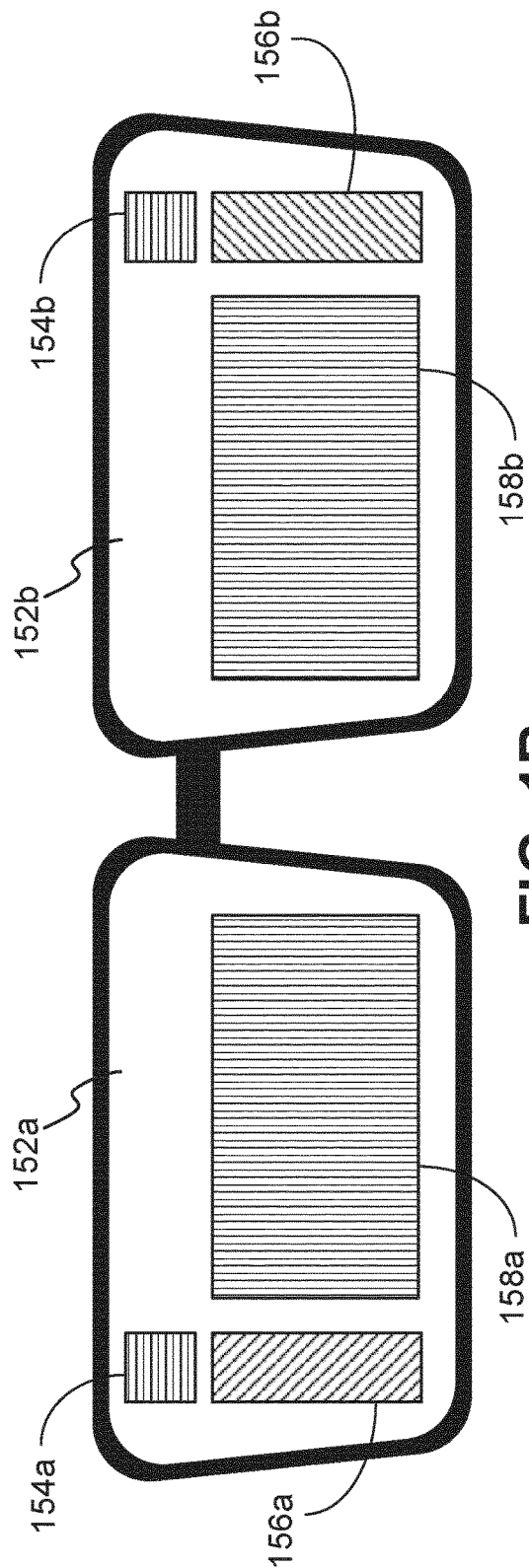
FIG. 1B is a schematic illustration of a binocular waveguide display with a first layout of diffractive optical components.
Figure 1C:
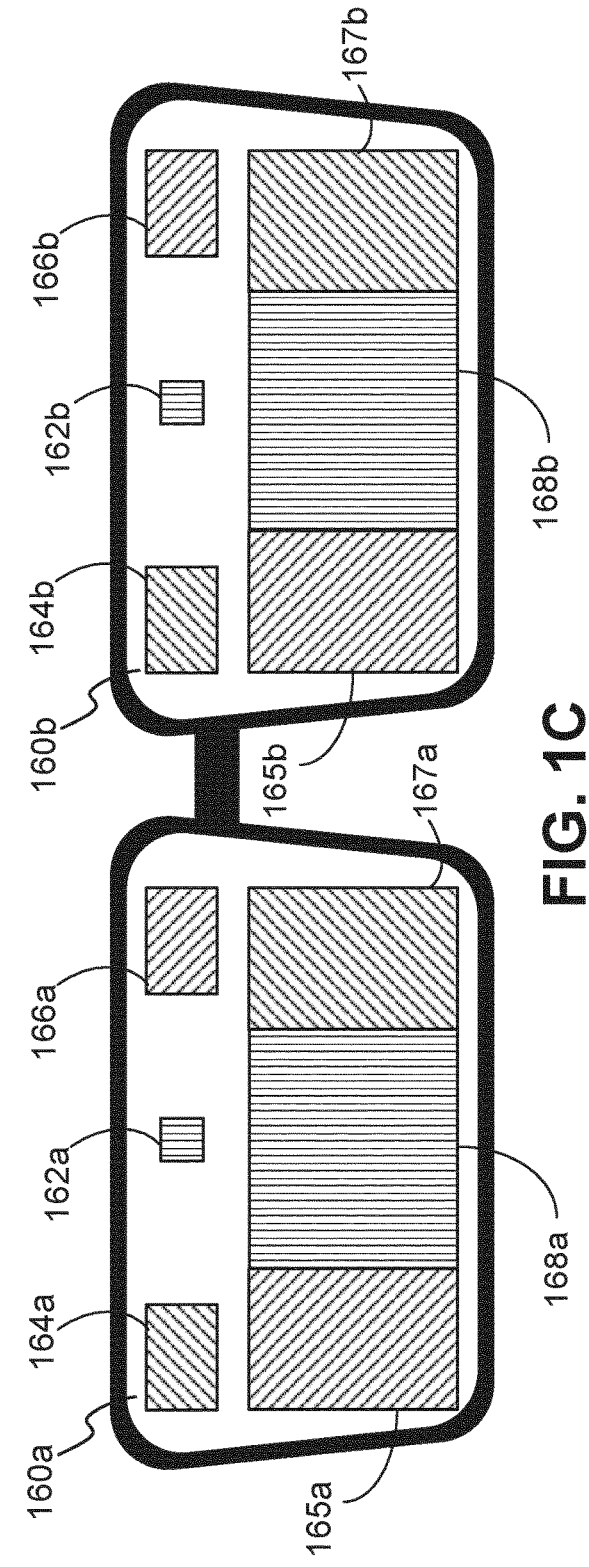
FIG. 1C is a schematic illustration of a binocular waveguide display with a second layout of diffractive optical components.

As illustrated in FIGS. 1B and 1C, waveguide displays having in-couplers, out-couplers, and pupil expanders may have various different configurations. An example layout of one binocular waveguide display is illustrated in FIG. 1B. In the example of FIG. 1B, the display includes waveguides 152a, 152b for the left and right eyes, respectively. The waveguides include in-couplers 154a,b, pupil expanders 156a,b, and components 158a,b, which operate as both out-couplers and horizontal pupil expanders. The pupil expanders 156a,b are arranged along an optical path between the in-coupler and the out-coupler. An image generator (not shown) may be provided for each eye and arranged to project light representing an image on the respective in-coupler.

An example layout of another binocular waveguide display is illustrated in FIG. 1C. In the example of FIG. 1C, the display includes waveguides 160a, 160b for the left and right eyes, respectively. The waveguides include in-couplers 162a,b. Light from different portions of an image may be coupled by the in-couplers 162a,b to different directions within the waveguides. In-coupled light traveling toward the left passes through pupil expanders 164a,b and 165a,b, while in-coupled light traveling toward the right passes through pupil expanders 166a,b and 167a,b. Having passed through the pupil expanders, light is coupled out of the waveguides using out-couplers 168a,b to substantially replicate an image provided at the in-couplers 162a,b.

In different embodiments, different features of the waveguide displays may be provided on different surfaces of the waveguides. For example (as in the configuration of FIG. 1A), the in-coupler and the out-coupler may both be arranged on the anterior surface of the waveguide (away from the users eye). In other embodiments, the in-coupler and/or the out-coupler may be on a posterior surface of the waveguide (toward the users eye). The in-coupler and out-coupler may be on opposite surfaces of the waveguide. In some embodiments, one or more of an in-coupler, an out-coupler, and a pupil expander, may be present on both surfaces of the waveguide. The image generator may be arranged toward the anterior surface or toward the posterior surface of the waveguide. The in-coupler is not necessarily on the same side of the waveguide as the image generator. Any pupil expanders in a waveguide may be arranged on the anterior surface, on the posterior surface, or on both surfaces of the waveguide. In displays with more than one waveguide layer, different layers may have different configurations of in-coupler, out-coupler, and pupil expander.

Figure 1E:
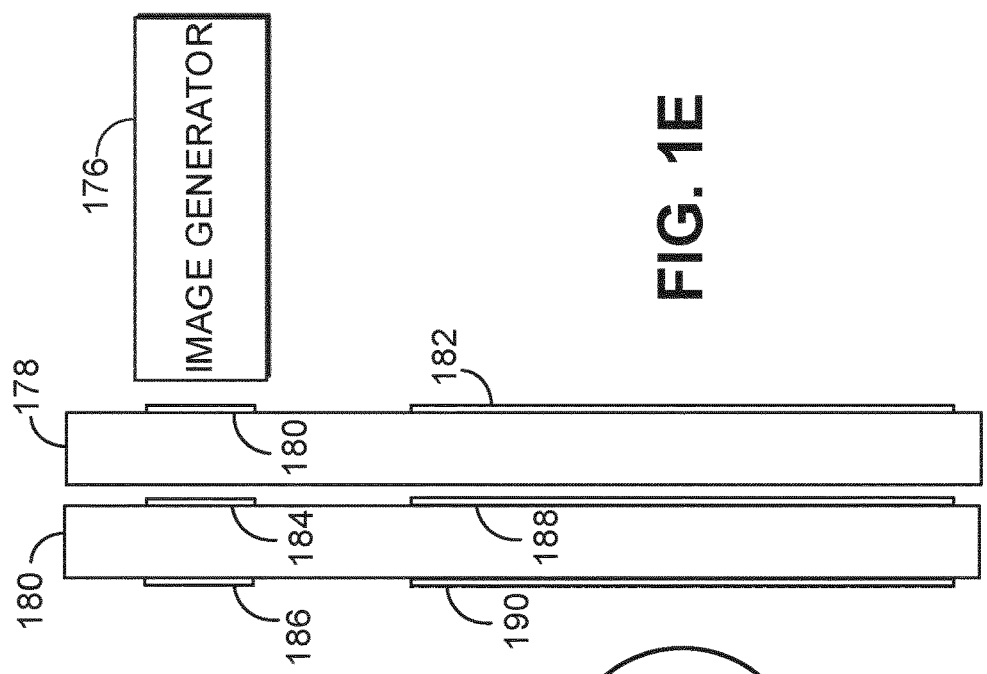
FIG. 1E is a cross-sectional schematic view of a double-waveguide display according to some embodiments.
Figure 1D:
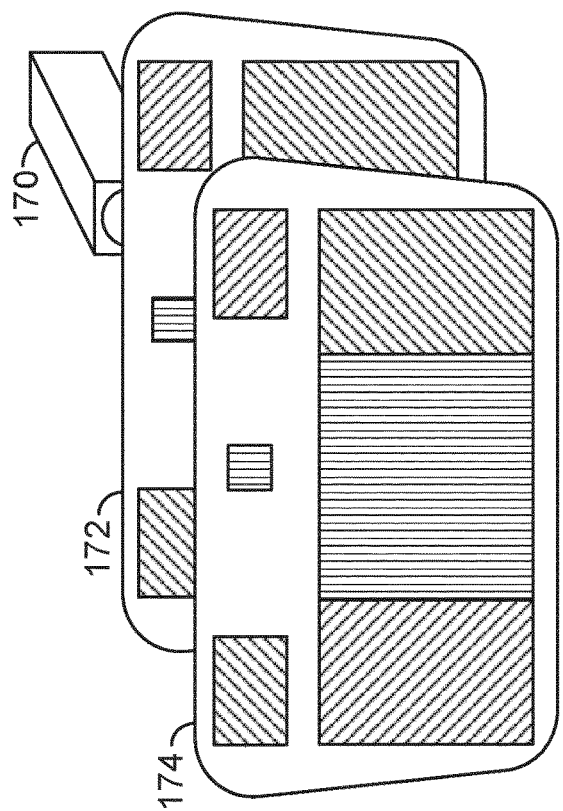
FIG. 1D is a schematic exploded view of a double-waveguide display according to some embodiments.

FIG. 1D is a schematic exploded view of a double waveguide display according to some embodiments, including an image generator 170, a first waveguide (WG$_1$) 172, and a second waveguide (WG$_2$) 174. FIG. 1E is a schematic side-view of a double waveguide display according to some embodiments, including an image generator 176, a first waveguide (WG$_1$) 178, and a second waveguide (WG$_2$) 180. The first waveguide includes a first transmissive diffractive in-coupler (DG1) 180 and a first diffractive out-coupler (DG6) 182. The second waveguide has a second transmissive diffractive in-coupler (DG2) 184, a reflective diffractive in-coupler (DG3) 186, a second diffractive out-coupler (DG4) 188, and a third diffractive out-coupler (DG5) 190. Different embodiments may use different arrangements of optical components (such as different arrangements of pupil expanders) on the first and second waveguides.

While FIGS. 1A-1E illustrate the use of waveguides in a near-eye display, the same principles may be used in other display technologies, such as head up displays for automotive or other uses.

Example Waveguide with Cross-Polarized Eye-Pupil Expanders.

Figure 2A:
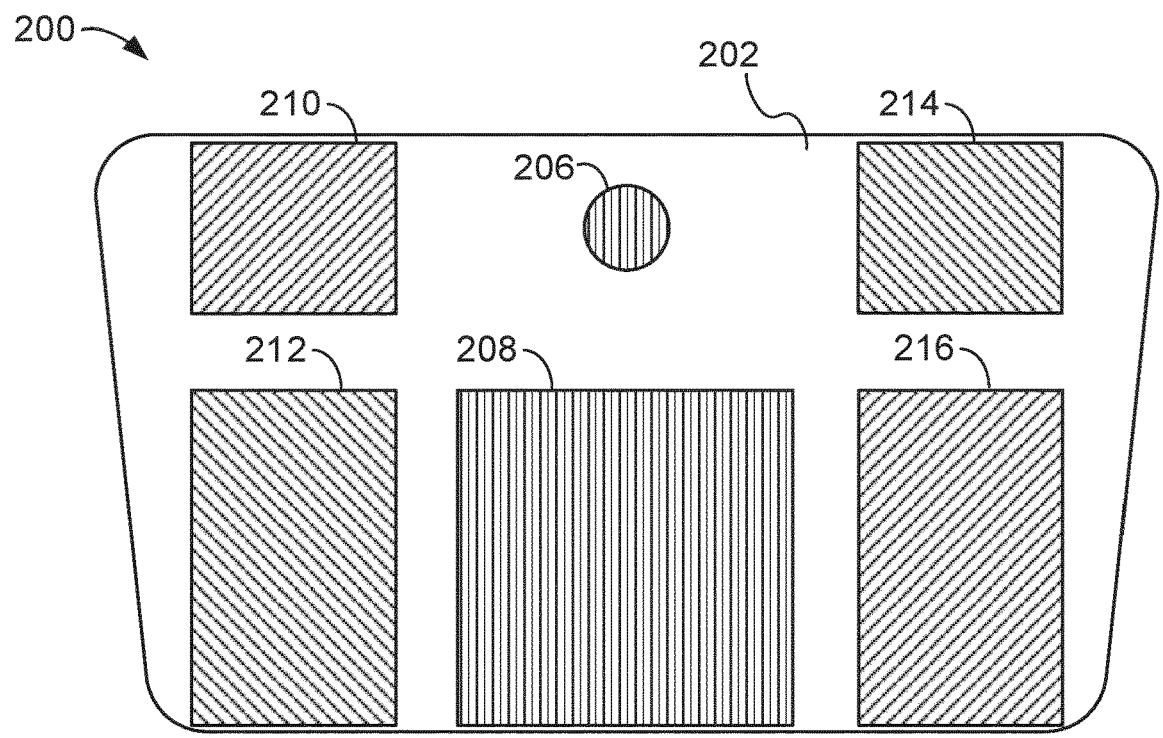
FIG. 2A is a schematic illustration of an example layout of optical features on a first surface of a waveguide according to some embodiments.
Figure 2B:
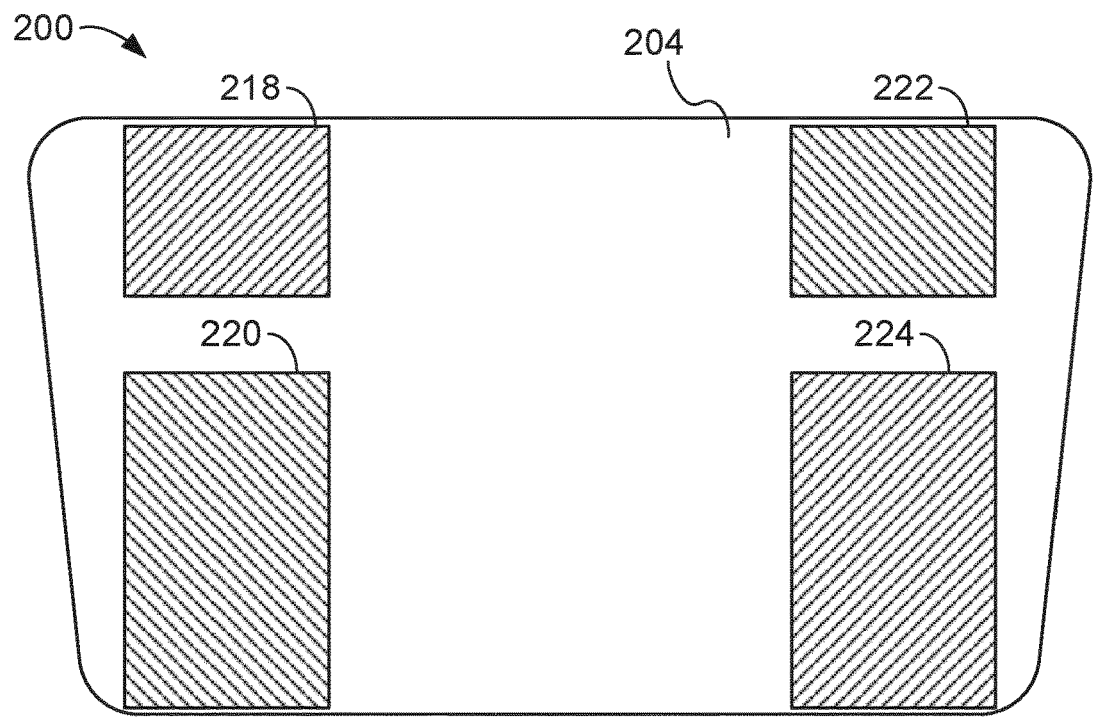
FIG. 2B is a schematic illustration of an example layout of optical features on a second surface of the waveguide of FIG. 2A according to some embodiments.

FIGS. 2A-2B illustrate an example arrangement of optical features on a waveguide according to some embodiments. A substantially planar waveguide 200 has a first surface (e.g. a front surface) 202 and a second surface (e.g. a rear surface) 204 that is on the opposite surface of the waveguide 200 from the first surface. In the example of FIGS. 2A-2B, the first surface 202 includes an in-coupler 206 and an out-coupler 208. While the out-coupler 208 may also operate as a horizontal pupil expander, it is referred to herein as an out-coupler to avoid confusion with other features that operate as pupil expanders. On the left side of the first surface, pupil expanders 210 and 212 lie along an optical path from the in-coupler 206 to the out-coupler 208. On the right side of the first surface, pupil expanders 214 and 216 lie along the optical path from the in-coupler 206 to the out-coupler 208.

The second surface 204 is illustrated in FIG. 2B in the same orientation as the first surface (i.e., illustrated as if the first surface were invisible). On the left side of the second surface, pupil expanders 218 and 220 lie along the optical path from the in-coupler 206 to the out-coupler 208. On the right side of the second surface, pupil expanders 222 and 224 lie along an optical path from the in-coupler 206 to the out-coupler 208.

In some embodiments, pupil expander 210 is substantially opposite pupil expander 218, pupil expander 212 is substantially opposite pupil expander 220, pupil expander 214 is substantially opposite pupil expander 222, and pupil expander 216 is substantially opposite pupil expander 224. In FIGS. 2A-2B, the pupil expanders are illustrated as being rectangular, but different shapes and configurations of pupil expanders are contemplated in different embodiments. Similarly, the shapes and configurations of the in-coupler 206 and the out-coupler 208 are not limited to those illustrated in FIGS. 2A-2B.

In FIGS. 2A-2B, the in-coupler 206 and out-coupler 208 are both illustrated on the first surface 202. In other embodiments, one or both of in-coupler 206 and out-coupler 208 are on the second surface 204.

Figure 3A:
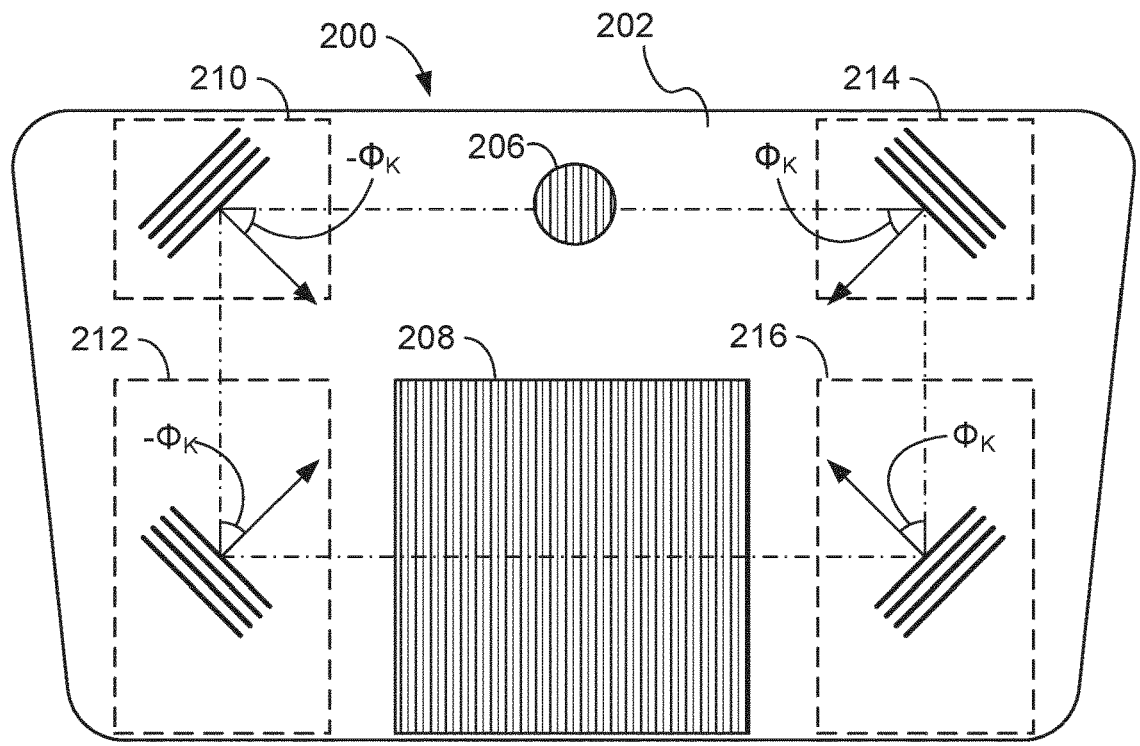
FIGS. 3A and 3B are schematic illustrations showing the orientation of grating lines in optical features of the waveguide of FIGS. 2A-2B according to some embodiments.
Figure 3B:
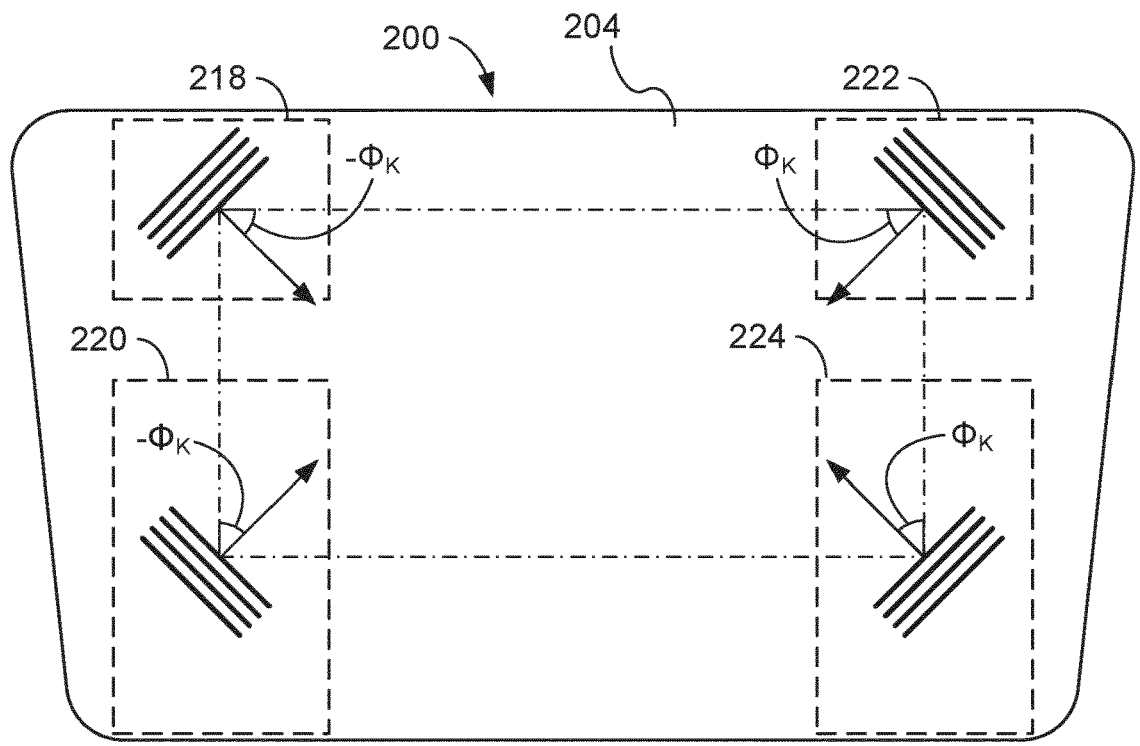

FIGS. 3A-3B are schematic illustrations showing an example orientation of the diffraction grating lines of each of the pupil expanders 210, 212, 214, 216, 218, 220, 222, 224. In the example illustrated in FIGS. 3A-3B, the grating lines of each pupil expander are oriented such that a normal to the grating lines makes an angle $\varphi_K$ with respect to incident light (as projected onto the plane of the waveguide). In the illustrated example, $\varphi_K=\pm 45°$ for each of the pupil expanders. In other embodiments, $\varphi_K$ may have values other than $\pm 45°$, and it may have different values for different ones of the pupil expanders.

In some embodiments, the pupil expanders on the first surface of the waveguide are configured to preferentially diffract light with a first polarization, e.g. p-polarization, also referred to as transverse-magnetic (TM) polarization, at an angle that propagates through the waveguide. The pupil expanders on the second surface of the waveguide are configured to preferentially diffract light with a second polarization, e.g. s-polarization, also referred to as transverse-electric (TE) polarization, at an angle that propagates through the waveguide. In some embodiments, instead of using s-polarization versus p-polarization, the pupil expanders are configured to use left-circular polarization versus right-circular polarization. Other complementary sets of polarization directions may alternatively be used.

In some embodiments, the pupil expanders on the first surface of the waveguide are configured to preferentially diffract light representing a first portion of an image coupled into the in-coupler, such as an upper portion of the image, at an angle that propagates through the waveguide. The pupil expanders on the second surface of the waveguide are configured to preferentially diffract light representing a second portion of an image coupled into the in-coupler, such as a lower portion of the image, at an angle that propagates through the waveguide.

Figure 4:
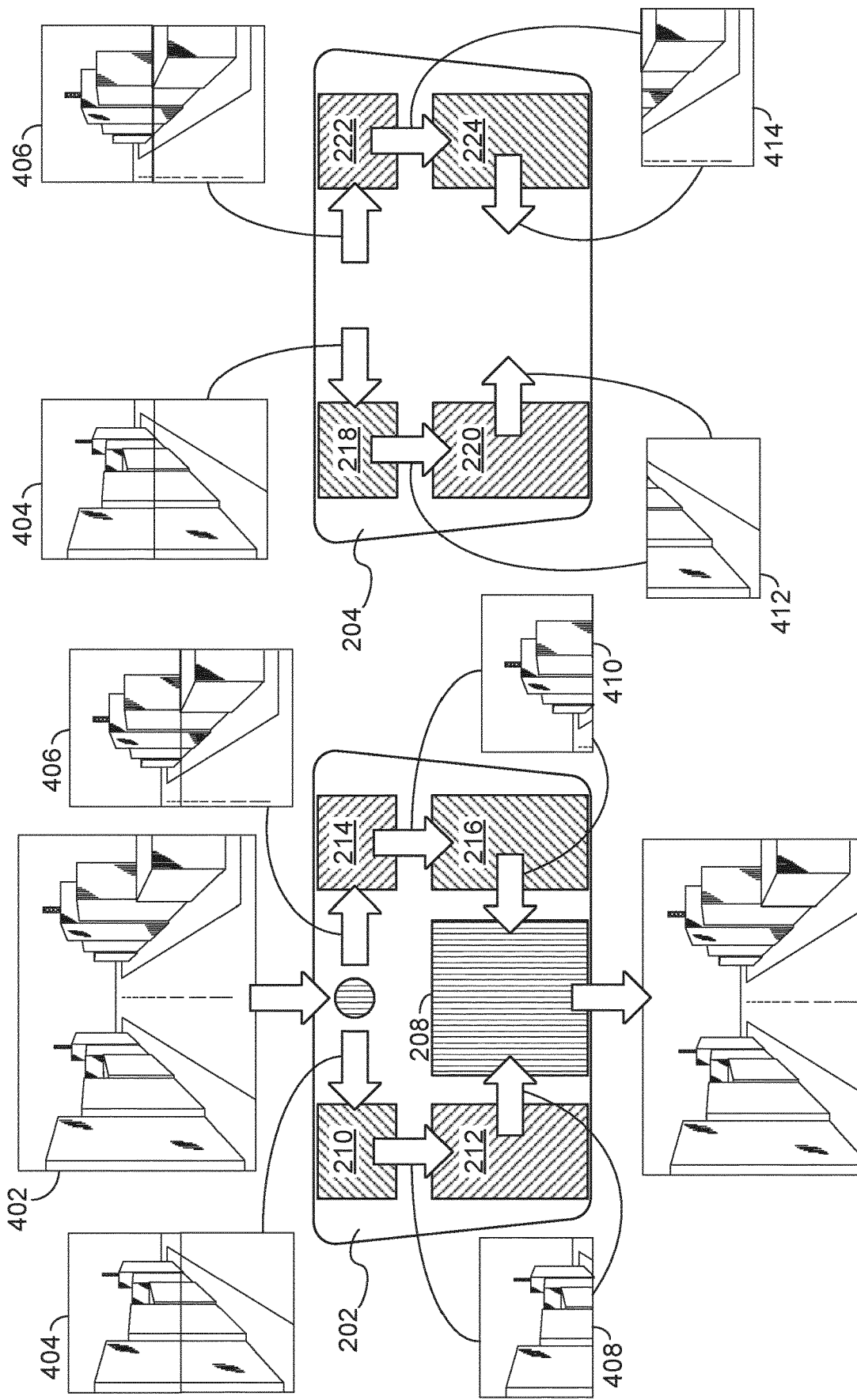
FIG. 4 is a schematic illustration showing an example operation of a waveguide according to some embodiments.

An example of the operation of a waveguide display according to some embodiments is illustrated schematically in FIG. 4. A complete image 402 is coupled into an in-coupler 206 of the waveguide. Light from the left half 404 of the image is diffracted into a range of angles that propagates leftward through the waveguide. Light from the right half 406 of the image is diffracted into a range of angles that propagates rightward through the waveguide.

In the example of FIG. 4, the pupil expanders on the first surface 202 of the waveguide are configured to diffract light representing the top half of the image 402 into a range of angles that propagate through the waveguide. The left half 404 of the image reaches pupil expander 210. Pupil expander 210 is configured to diffract the top portion 408 of the left half toward pupil expander 212. Pupil expander 212 is configured to diffract the top-left portion 408 of the image toward the out-coupler 208. The right half 406 of the image reaches pupil expander 214. Pupil expander 214 is configured to diffract the top portion 410 of the right half toward pupil expander 216. Pupil expander 216 is configured to diffract the top-right portion 410 of the image toward the out-coupler 208.

The pupil expanders on the second surface 204 of the waveguide are configured to diffract light representing the bottom half of the image 402 into a range of angles that propagate through the waveguide. The left half 404 of the image reaches pupil expander 218. Pupil expander 218 is configured to diffract the bottom portion 412 of the left half toward pupil expander 220. Pupil expander 220 is configured to diffract the bottom-left portion 412 of the image toward the out-coupler 208. The right half 406 of the image reaches pupil expander 222. Pupil expander 222 is configured to diffract the bottom portion 414 of the right half toward pupil expander 224. Pupil expander 224 is configured to diffract the bottom-right portion 414 of the image toward the out-coupler 208.

In some embodiments, the pupil expanders 210 and 212 on the first surface of the left side are configured to preferentially diffract light with a first propagation direction corresponding to a first polarization state but to reflect light (via total internal reflection, or via high-efficiency zero-order diffraction) with a second, substantially complementary polarization state. Conversely, the pupil expanders 218 and 220 on the second surface of the left side are configured to preferentially diffract light with the second polarization state but to reflect light (via total internal reflection, or via high-efficiency zero-order diffraction) with the first polarization state. For example, the pupil expanders 210 and 212 may be configured to preferentially diffract p-polarized light and to reflect s-polarized light, while the pupil expanders 218 and 220 may be configured to preferentially diffract s-polarized light and to reflect p-polarized light (or vice versa). In the present disclosure, light that is diffracted to a zero-order mode within the waveguide is referred to as being reflected.

In some embodiments, the pupil expanders 214 and 216 on the first surface of the right side are configured to preferentially diffract light with a first polarization state but to reflect light (via total internal reflection, or via high-efficiency zero-order diffraction) with a second, substantially complementary polarization state. Conversely, the pupil expanders 222 and 224 on the second surface of the right side are configured to preferentially diffract light with the second polarization state but to reflect light with the first polarization state. For example, the pupil expanders 214 and 216 may be configured to preferentially diffract p-polarized light and to reflect s-polarized light, while the pupil expanders 222 and 224 may be configured to preferentially diffract s-polarized light and to reflect p-polarized light (or vice versa).

With reference to the left-side pupil expanders, 210, 212, 218, and 220, a potential benefit of using polarization-selective diffraction gratings is as follows. When pupil expanders 210 and 212 use the same polarization, and that polarization is different from the polarization used by pupil expanders 218 and 220, pupil expander 212 is less likely to direct light from pupil expander 218 toward the out-coupler. Otherwise, light diffracted first by pupil expander 218 (on the second surface) and subsequently by pupil expander 212 (on the first surface) could be coupled out of the waveguide in the wrong direction, appearing as stray light that diminishes the quality of the displayed image. The use of polarization-selective diffraction gratings thus prevents pupil expanders 212, 216, 220, and 224 from diffracting light that was meant to be diffracted by pupil expanders 220, 224, 212, and 216, respectively. In some embodiments, each quarter of the display has rays emitted with polar and azimuth angles into a specific trigonometric sector (see for example FIG. 6B). The corresponding EPE may have a pitch size that is configured to handle those directions. If another direction impinges on the first EPE, the ray may not satisfy the TIR condition and may escape from the waveguide.

In the example of FIG. 4, each pupil expander is paired with another pupil expander on the same side (e.g. pupil expanders 210 and 212 on the first surface). It may be noted that in other embodiments, each pupil expander may be paired with a pupil expander on the other side. For example, in an alternative embodiment, pupil expanders 210 on the first surface and 220 on the second surface use the same polarization and are configured to direct the same portion of the in-coupled image toward the out-coupler, and similar changes can be made to the other pupil expanders.

To clarify the operation of particular embodiments, the in-coupled image 402 is schematically illustrated as being neatly divided into quadrants 408, 410, 412, 414. It should be understood that in practical embodiments, the different portions of the image may overlap to some degree and may have different sizes and irregular shapes.

Terms such as left, right, up, down, upper, lower, front, and back have been used herein to clarify particular embodiments. However, it should be understood that the configuration of the waveguide can be rotated and/or inverted for use in various other embodiments without changing the principles of operation.

FIG. 4 illustrates image flow inside of an optical system according to some embodiments. Practically, the display's area is divided into four parts. The in-coupler is splitting half of the width of the display into one direction inside of the waveguide and the other half into the opposite direction. Then, both eye pupil expander (EPE) regions have a top grating on one side of the glass wafer and a bottom EPE on the opposite side of the glass wafer. The top EPE has a pitch size that preferentially TIR-diffracts only the top of display's content while the bottom EPE has a pitch size that TIR-diffracts the bottom image content.

The vertical field of view of an AR headset based on diffractive optics is limited by gratings used as EPEs. The design of the EPE calls for selection of the grating's pitch in order to optimize it for the desired vertical field of view. For that purpose, the geometry is generally set for deviating a symmetrically distributed beam. This involves an assumption that the display is centered on the optical axis of the projection lens and that the angular distribution of azimuth orientations is symmetrical. This in turn means that the top part of the display (positive azimuth angles) will produce only azimuth angles of a specific sign while the bottom part of the display (below the optical axis) will produce azimuth angles of the opposite sign. For the left part of the display (FIG. 4) the azimuth angle average is $\pi$, hence here, instead of measuring angles over $[0,2\pi]$, the azimuth angles may be measured over $[-\pi,+\pi]$.

In some example embodiments, on the other hand, instead of optimizing the grating to act symmetrically around the optical axis, we can select the grating's pitch size in another way. We can split the display in two vertical parts, the top and bottom parts on each side of the optical axis. The top part will send only rays with azimuth angles of one sign, and we can define a pitch of the bending grating that preferentially deviates these rays, with a minimum azimuth direction around $\beta=0$ and a maximum $|\beta|$. This differs from an optimization of the grating's pitch in which $\beta=\varphi_m$ and $-\beta=\varphi_M$ with $\varphi_m=-\varphi_M$. The bottom part of the display, sending rays with an azimuth angle opposite in sign to the azimuth angle of the top part, will send rays of azimuthal angle content between $\beta=0$ and a minimum $-|\beta|$. Those rays will hit an EPE with a different pitch size.

Example embodiments use EPE regions with two different gratings in TIR conical mounting, one for the top of the display and one for the bottom of the display, that act as beam deviators and expanders.

As these embodiments involve the use of two gratings in a single EPE region, these gratings are set at different locations. In some embodiments, one is set on one face of the waveguide and the other one on the opposite face. We can call them top and bottom EPE. Hence, the image flow inside of the waveguide is divided as shown in FIG. 4.

Figure 5:
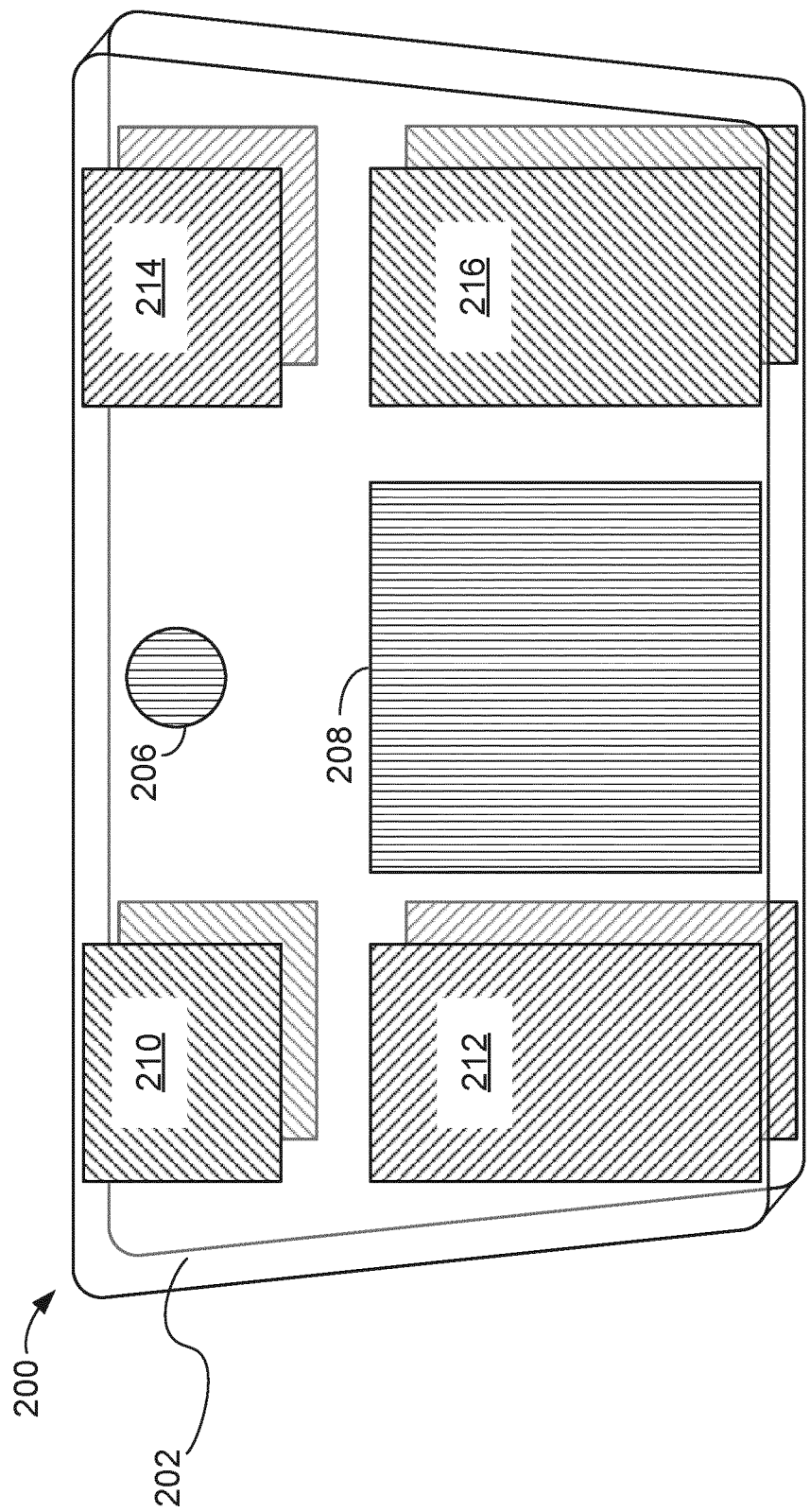
FIG. 5 is a schematic perspective view of the waveguide of FIG. 4 according to some embodiments.

FIG. 5 is a schematic perspective view of the waveguide of FIG. 4.

One issue addressed by some embodiments is to enable the light emitted by the top part of the display to be diffracted only by one of the gratings in the EPE region, either the top or bottom one, and to enable the light emitted by the bottom part of the display to be diffracted by the remaining grating. For that purpose, in some embodiments, the top and bottom EPE gratings act on different polarizations.

For instance, the top EPE may primarily diffract s-polarized light, while if it is hit by p-polarized light, the p-polarized light reflects back by TIR inside of the waveguide. And the bottom EPE has the opposite property, preferentially diffracting p-polarized light and reflecting s-polarized light by TIR.

In some embodiments, the light engine or other image generator emits light of both polarizations. For instance, it may be based on a DLP or OLED imager. In example embodiments, the in-coupler is able to diffract both polarizations, s and p. In particular, the in-coupler operates to diffract one half of the display's image into one diffraction mode inside of the waveguide, while it diffracts the other half into the complementary mode into the opposite direction. In some embodiments, the image generator may use light of different (e.g. complementary) polarizations for different portions of the images. For example, the image generator may use s-polarization for an upper portion of the image and p-polarization for a lower portion of the image, or vice-versa. In another example, the image generator may use left-circular polarization for an upper portion of the image and right-circular polarization for a lower portion of the image, or vice-versa.

Figure 6A:
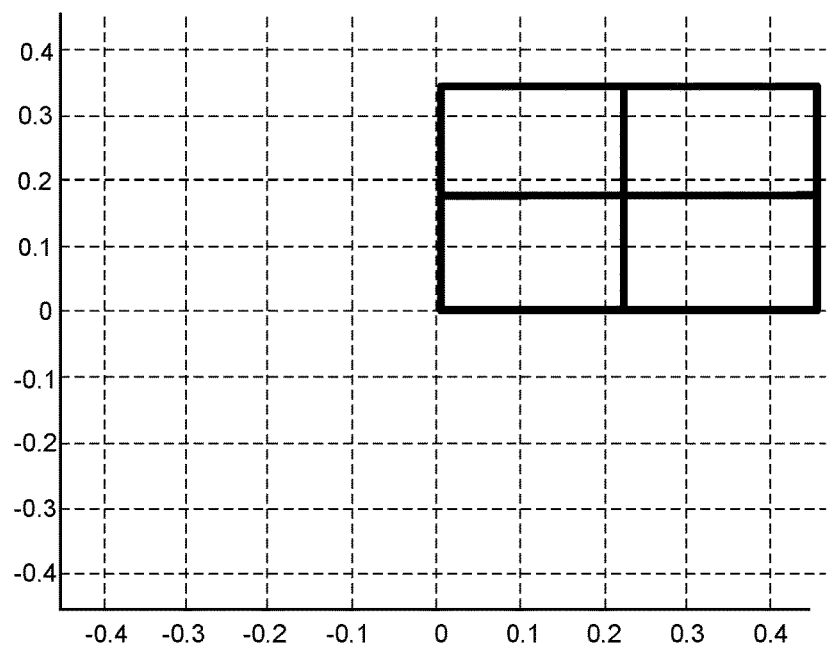
FIG. 6A illustrates the top-right part of the display area.
Figure 6B:
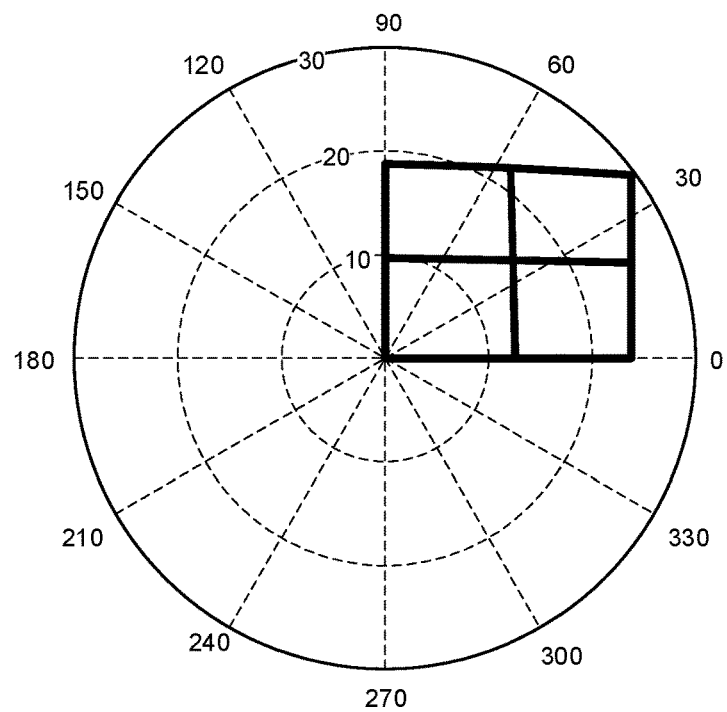
FIG. 6B illustrates the angular polar and azimuth space the display is emitting.
Figure 6D:
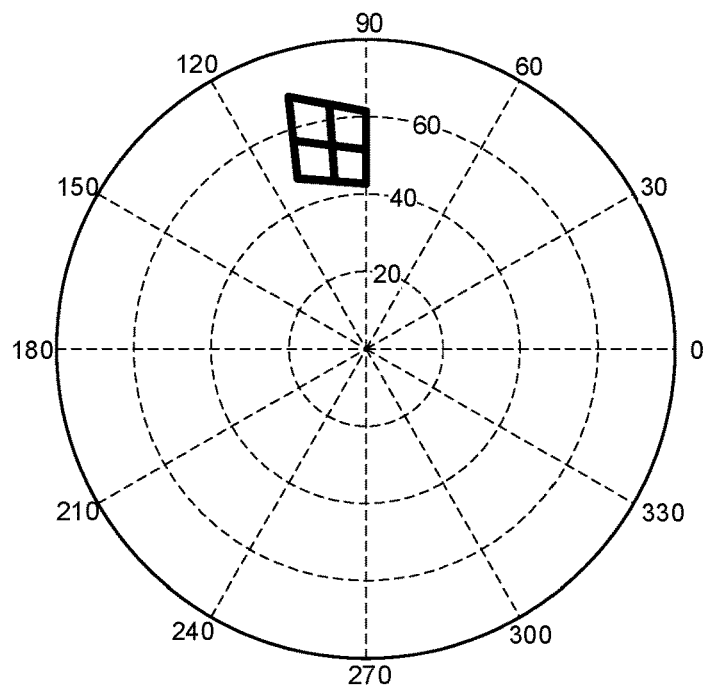
FIG. 6D illustrates angular space occupied by rays diffracted after the top eye pupil expander according to some embodiments.
Figure 6C:
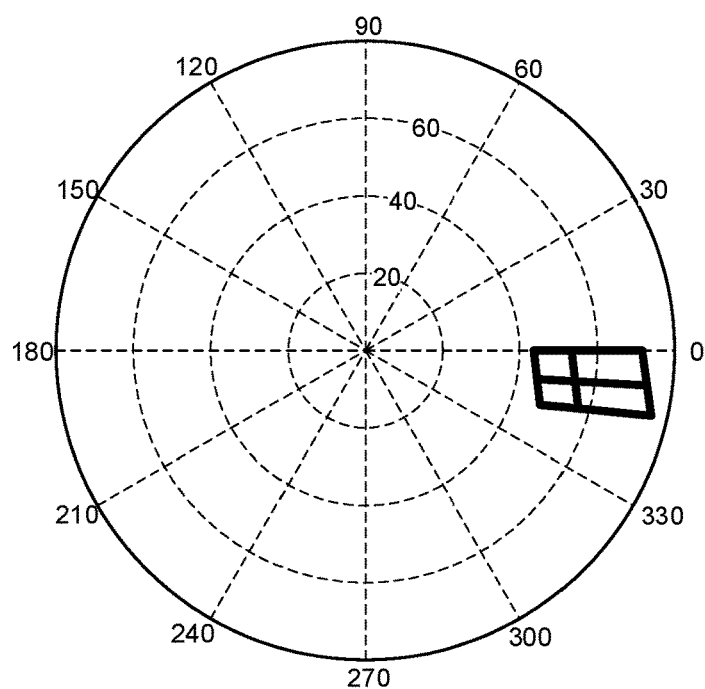
FIG. 6C illustrates the angular space occupied by rays diffracted after the in-coupler.

FIG. 6A illustrates the top-right part of the display area. FIG. 6B illustrates the angular polar and azimuth space the display is emitting. FIG. 6C illustrates the angular space occupied by rays diffracted after the in-coupler. FIG. 6D illustrates angular space occupied by rays diffracted after the top EPE.

Figure 7A:
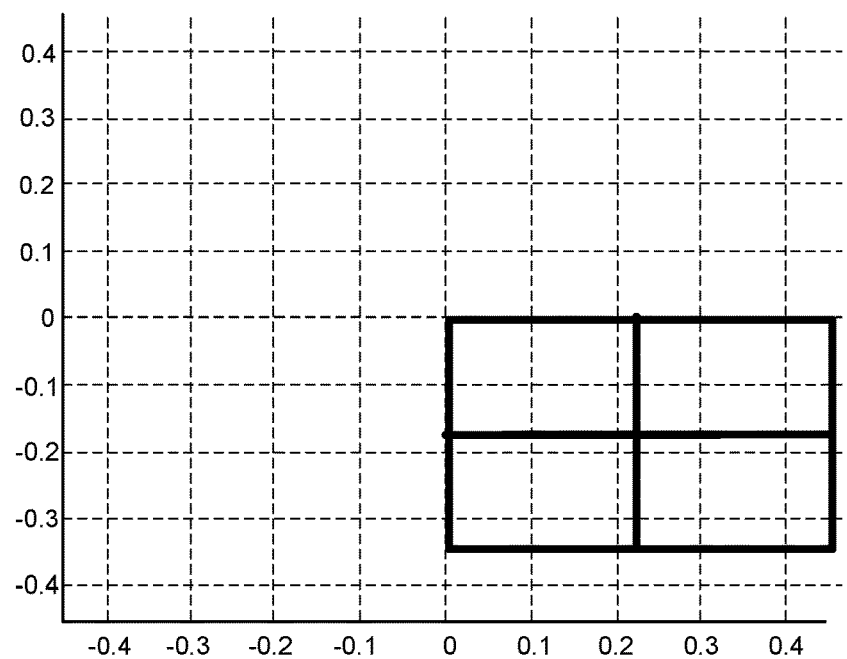
FIG. 7A illustrates the bottom-right part of the display area.
Figure 7B:
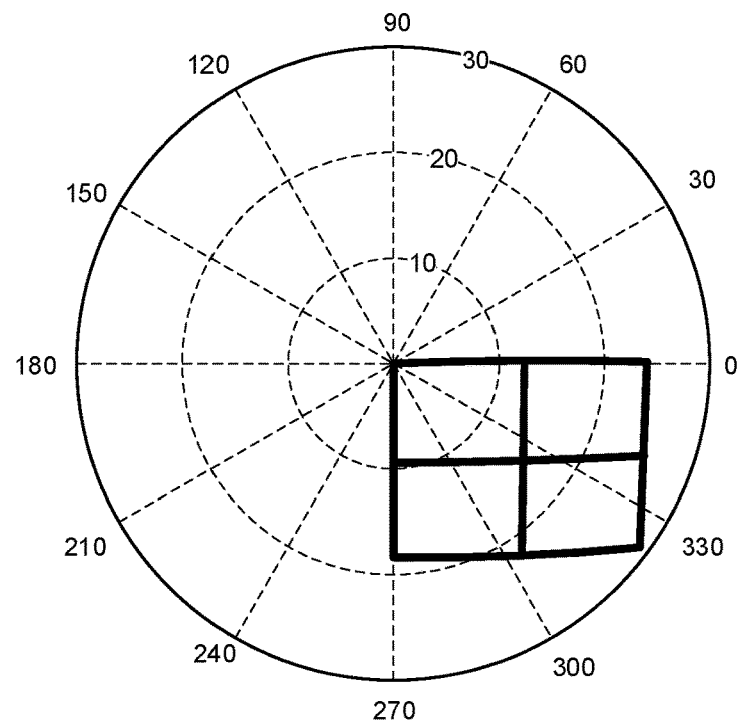
FIG. 7B illustrates angular polar and azimuth space the display is emitting.
Figure 7D:
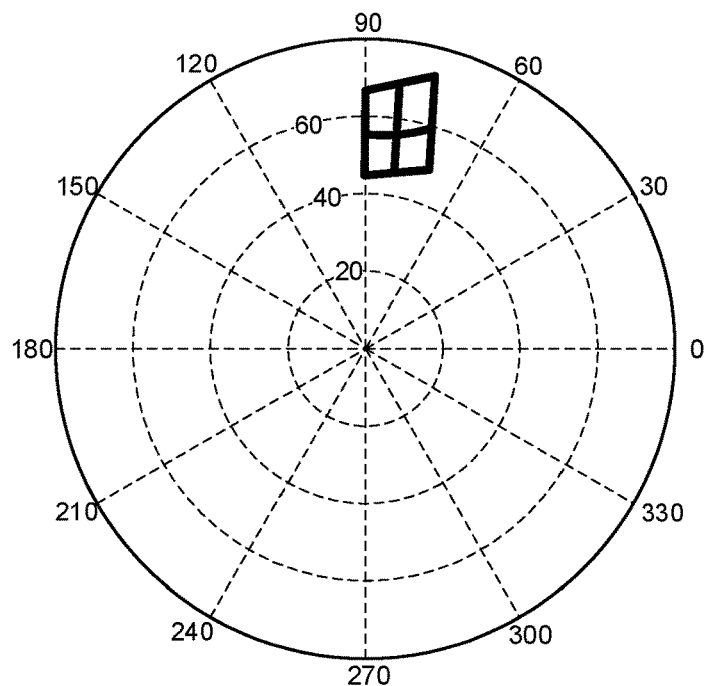
FIG. 7D illustrates angular space occupied by rays diffracted after the bottom eye pupil expander according to some embodiments.
Figure 7C:
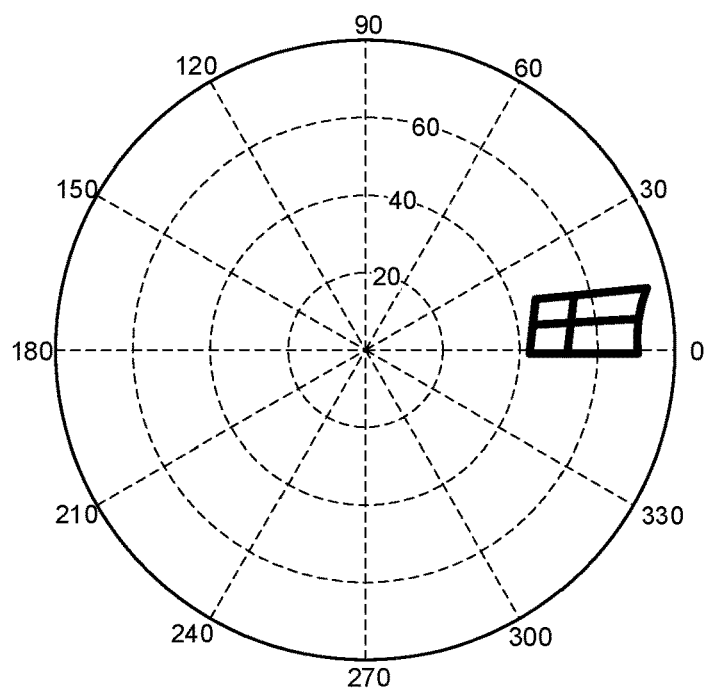
FIG. 7C illustrates angular space occupied by rays diffracted after the in-coupler.

FIG. 7A illustrates the bottom-right part of the display area. FIG. 7B illustrates angular polar and azimuth space the display is emitting. FIG. 7C illustrates angular space occupied by rays diffracted after the in-coupler. FIG. 7D illustrates angular space occupied by rays diffracted after the bottom EPE.

As there is one grating dedicated to each part of the display (top or bottom), the result is a very nice improvement in the vertical field of view, which may otherwise be limited in the system by the EPE.

Figure 8A:
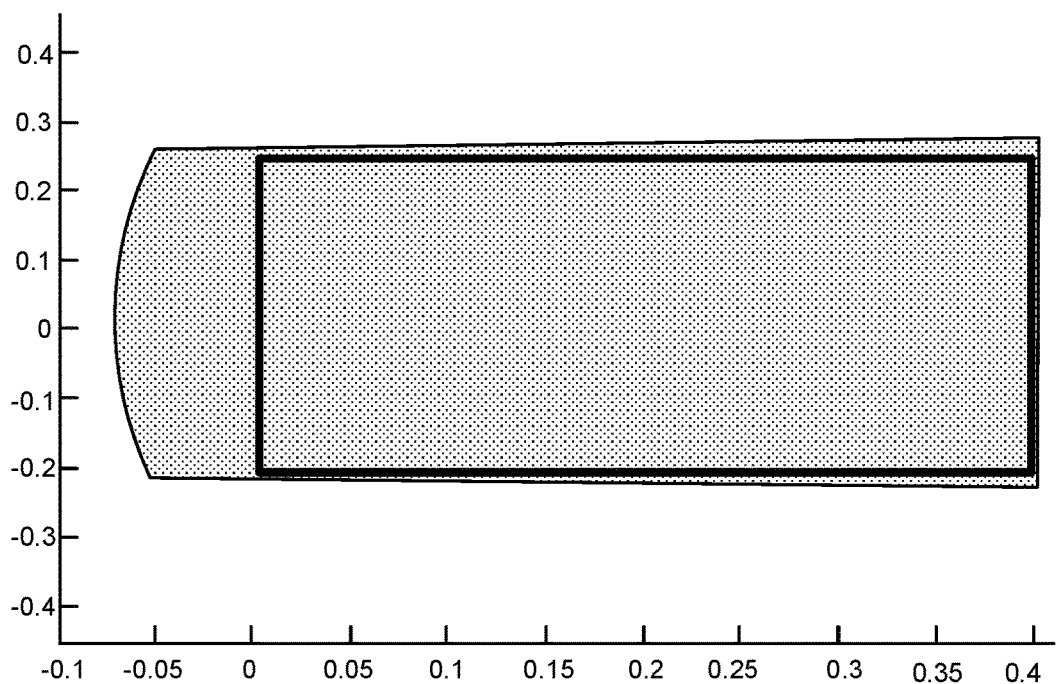
FIGS. 8A-8D illustrate an expected maximal display right-hand size and field of view possible in a system with a conventional eye pupil expander.
Figure 8C:
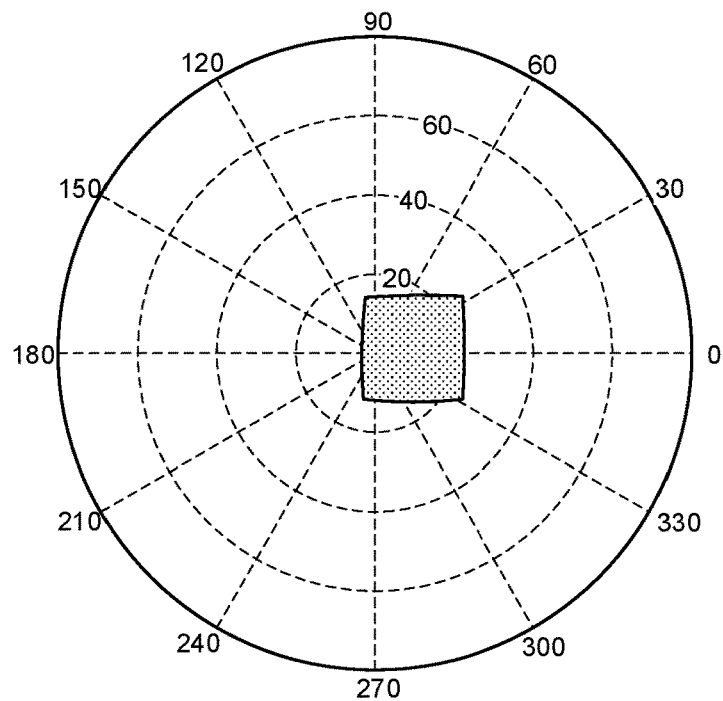
Figure 8B:
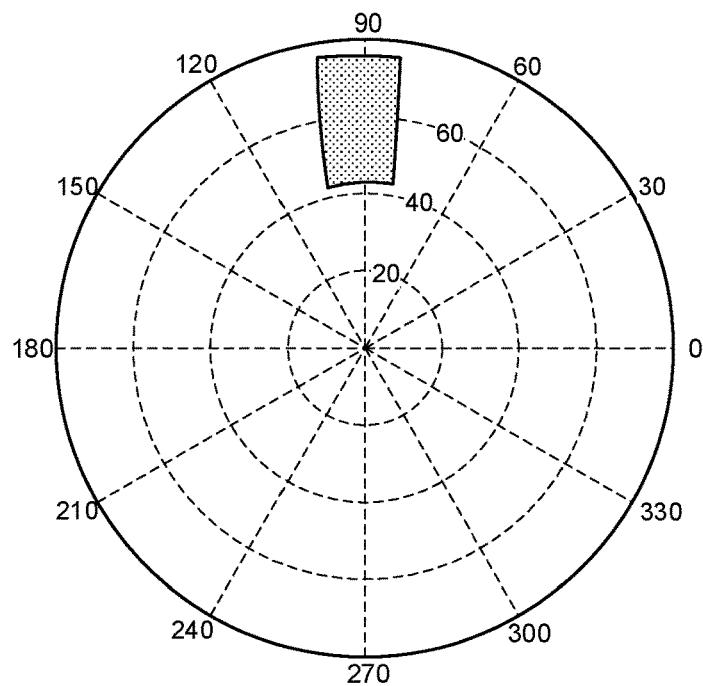
Figure 8D:
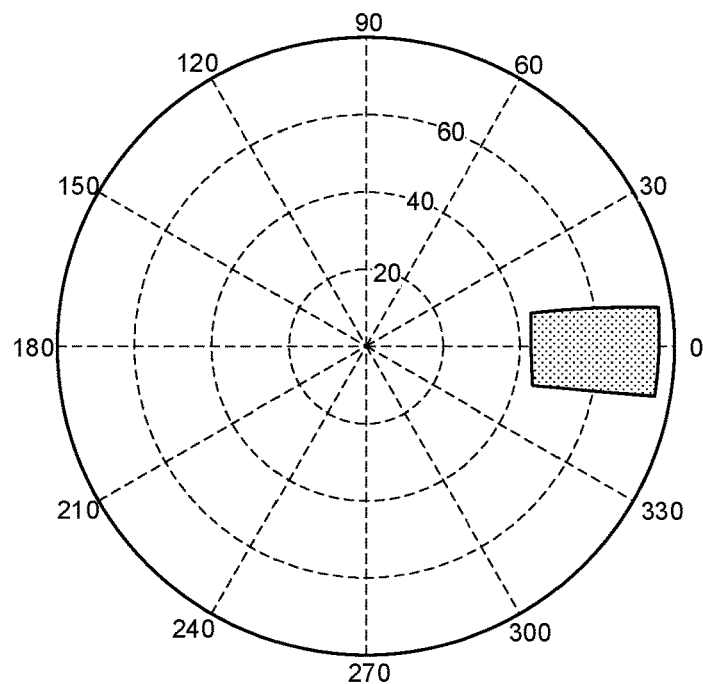

FIGS. 8A-8D illustrate an expected display size and field of view possible for the right half of a system with a conventional EPE. In this example, the waveguide has a refractive index $n_2$=1.5, the incident light has a wavelength $\lambda$=625 nm, the orientation of the grating lines is $\varphi_K$=45°, the diffractive order used is M=+2, grazing angle inside the waveguide is $\theta_d^g$=75°, angle of incident light that diffracts to the grazing angle is $\theta_i^g$9=4°, and the grating pitch is $\Lambda_e$=734.3 nm. FIG. 8A illustrates the left hand side display's (M=+2) maximal usable size in (x,y). FIG. 8B illustrates the angular bandpass after the EPE. FIG. 8C illustrates the angular bandpass before the in-coupler. FIG. 8D illustrates the angular bandpass after the in-coupler.

FIGS. 9A-9D illustrate an example display size and field of view possible in a system with top and bottom gratings for an EPE. In the example, the waveguide has a refractive index of $n_2$=1.5, the incident light has a wavelength $\lambda$=625 nm, the EPE gratings have an orientation of $\varphi_K$=45°, the diffractive mode is M=+2, the grazing angle in the waveguide is $\theta_d^g$=75°, incident light at an angle $\theta_i^g$=4° diffracts to the grazing angle, the top EPE grating has a pitch of $\Lambda_e^T$=852 nm, and the bottom EPE grating has a pitch of $\Lambda_e^B$=610 nm.

Figure 9A:
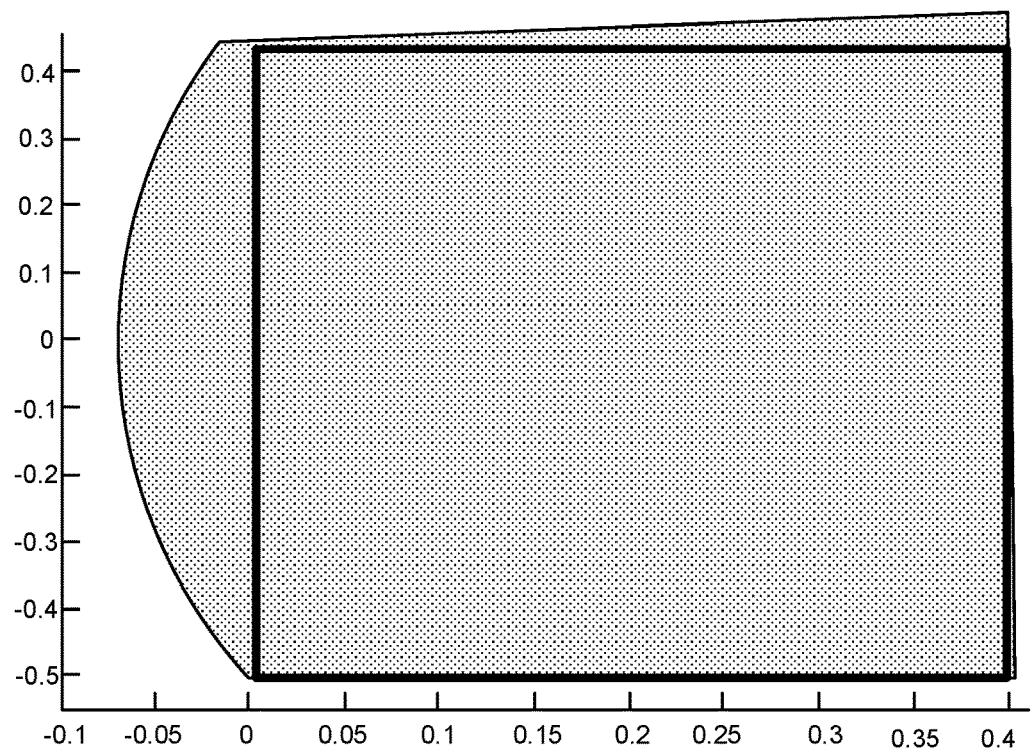
FIGS. 9A-9D illustrate an example display right-hand size and field of view possible in a system with top and bottom gratings for an eye pupil expander according to some embodiments.
Figure 9C:
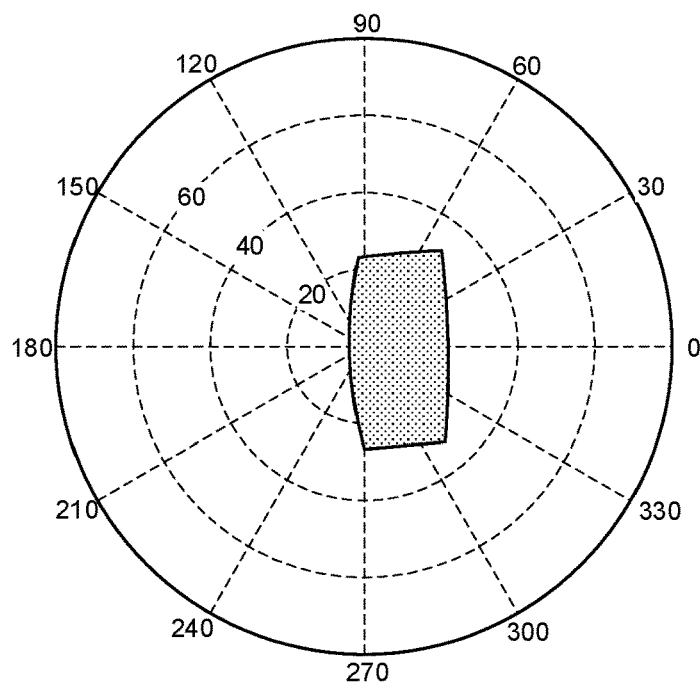
Figure 9B:
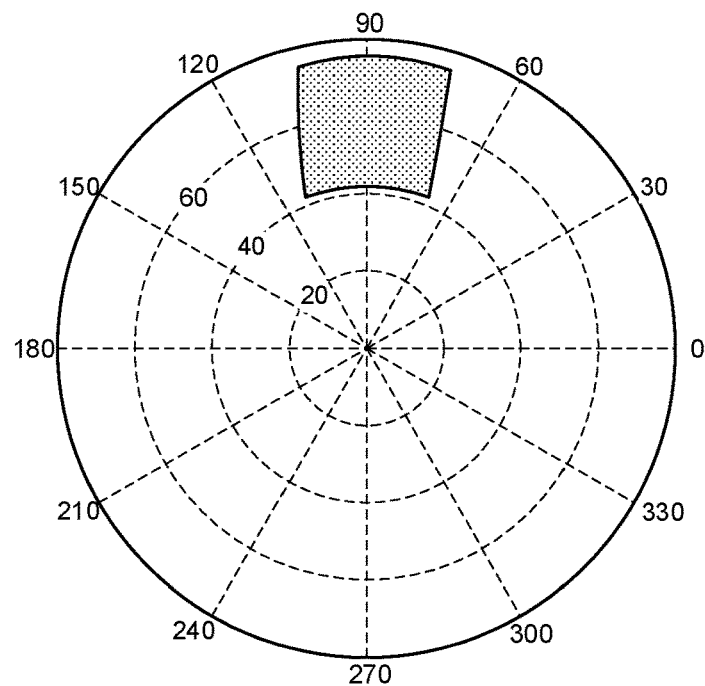
Figure 9D:
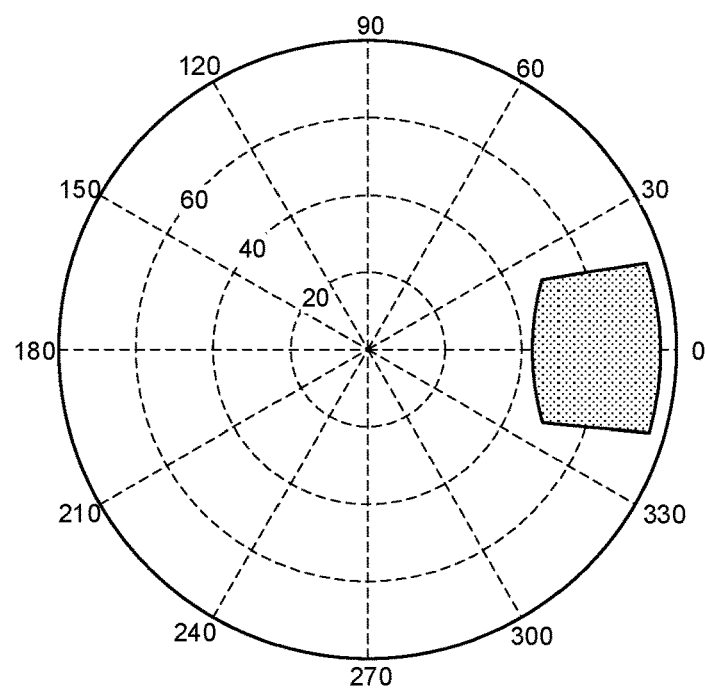

FIG. 9A illustrates the maximal usable size in (x,y) for the left hand side display (M=+2). FIG. 9B illustrates the angular bandpass after the EPE. FIG. 9C illustrates the angular bandpass before the in-coupler. FIG. 9D illustrates the angular bandpass after the in-coupler.

Comparing FIGS. 8A-8D with 9A-9D, it is possible to see the effect on the vertical field of view in embodiments that split the EPE for the top and bottom display areas. Particularly comparing FIG. 8C with FIG. 9C, it is seen that the vertical field of view has substantially doubled with the use of cross-polarized EPE gratings.

Depending on the orientation $\varphi_K$ of the EPE, different formulas may be used to calculate the pitch size of the EPE. Hence, there will also be different formulas for calculating the pitch sizes of the top and bottom EPE, depending on the orientation. In order to give some sense of how the pitch size varies for the top and bottom EPE with respect to the original EPE, we can take the example of $\varphi_K$=45°, which is the optimal value for the largest possible vertical FoV.

Example formulas are:

$$\Lambda_e^T = \frac{M\lambda}{2\cos\varphi_K}$$

and $$\Lambda_e^B = \frac{NM\lambda}{2\cos\varphi_K}$$

with $$N = \frac{1}{n_2 \sin\theta_d^g}$$

From which follows the relationship $$\frac{\Lambda_e^B}{\Lambda_e^T} = N.$$

The highest azimuth angles supported by each EPE will be:

$$\beta^T = \cos^{-1}(N\cos\varphi_K) - \varphi_K$$

$$\beta^B = \varphi_K - \cos^{-1}\left[\cos\varphi_K - \frac{N^2-1}{4\cos\varphi_K}\right]$$

and those are related to the vertical field of view. The higher $\beta^T$ and $\beta^B$, the higher the vertical FoV. The previous equations are only valid for $\varphi_K$ in the vicinity of 45 degrees, which may be used to provide a right angle deviation of the light inside of the waveguide.

Figure 10A:
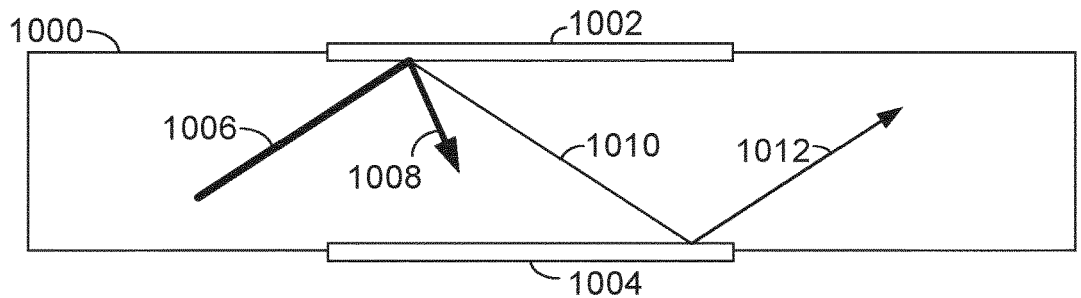
FIGS. 10A-10D illustrate different interaction cases between rays and gratings depending on the polarization of the light according to some embodiments.

FIGS. 10A-10D illustrate different interaction cases between rays and gratings depending on the polarization of the light. FIGS. 10A-10D schematically illustrate a cross-sectional view of a portion of a waveguide 1000 having a polarization-selective eye pupil expander 1002 on the top surface and another polarization-selective eye pupil expander 1004 on the bottom surface. Eye pupil expander 1002 on the top surface has a greater diffraction efficiency for x-polarized light, and eye pupil expander 1004 on the bottom surface has a greater diffraction efficiency for y-polarized light. As shown in FIG. 10A, an x-polarized ray 1006 incident on eye pupil expander 1002 is primarily diffracted to order M (1008). Another portion may be diffracted to order zero (1010). On encountering the eye pupil expander 1004, which has a greater diffraction efficiency for y-polarized light, the x-polarized ray is primarily reflected by total internal reflection (1012).

Figure 10B:
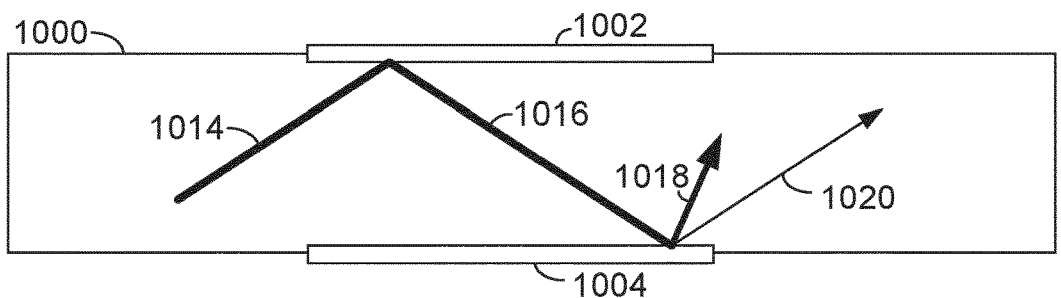

As shown in FIG. 10B, a y-polarized ray 1014 incident on eye pupil expander 1002 is primarily reflected by total internal reflection (1016). On encountering the eye pupil expander 1004, which has a greater diffraction efficiency for y-polarized light, the y-polarized ray is primarily diffracted to order M (1018). Another portion may be diffracted to order zero (1020).

Figure 10C:
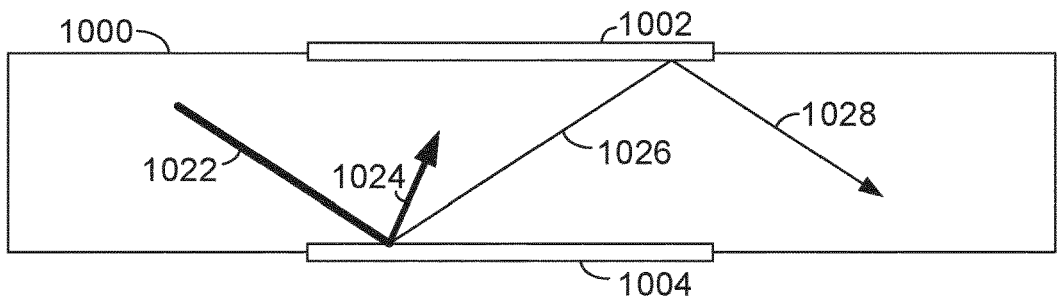

As shown in FIG. 10C, a y-polarized ray 1022 incident on eye pupil expander 1004 is primarily diffracted to order M (1024). Another portion may be diffracted to order zero (1026). On encountering the eye pupil expander 1002, which has a greater diffraction efficiency for x-polarized light, the y-polarized ray is primarily reflected by total internal reflection (1028).

Figure 10D:
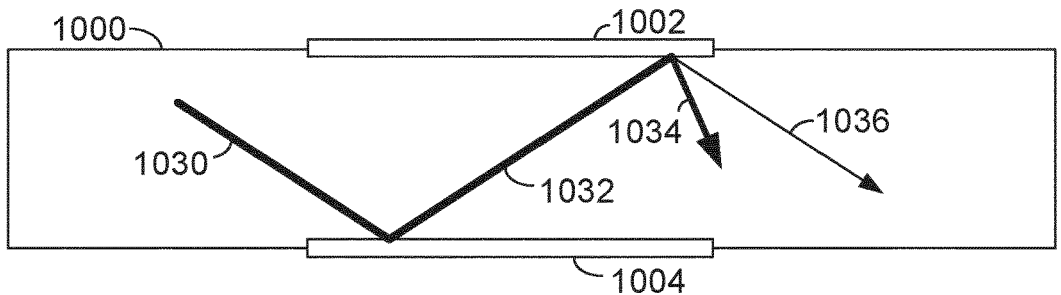

As shown in FIG. 10D, an x-polarized ray 1030 incident on eye pupil expander 1004 is primarily reflected by total internal reflection (1032). On encountering the eye pupil expander 1002, which has a greater diffraction efficiency for x-polarized light, the x-polarized ray is primarily diffracted to order M (1034). Another portion may be diffracted to order zero (1036).

The eye pupil expanders 1002 and 1004 of FIGS. 10A-10D may correspond to any of the opposing pairs of eye pupil expanders described herein, such as eye pupil expander pairs 210 and 218, 212 and 220, 214 and 222, or 216 and 224.

In the present disclosure, modifiers such as "first," "second," "third," and the like are sometimes used to distinguish different features. These modifiers are not meant to imply any particular order of operation or arrangement of components. Moreover, the terms "first," "second," "third," and the like may have different meanings in different embodiments. For example, a component that is the "first" component in one embodiment may be the "second" component in a different embodiment.

Additional Embodiments

An apparatus according to some embodiments includes: a waveguide having an in-coupler and an out-coupler; a first diffraction grating along an optical path from the in-coupler to the out-coupler wherein the first diffraction grating is configured to preferentially diffract light having a first polarization state; a second diffraction grating along the optical path from the in-coupler to the out-coupler, wherein the second diffraction grating is configured to preferentially diffract light having a second polarization state substantially complementary to the first polarization state. Either or both of the first and second diffraction gratings may be a pupil expander. In some embodiments, a diffraction grating is configured to preferentially diffract light having a first polarization state when the diffraction grating has a greater diffraction efficiency for light having the first polarization state than for light having a second polarization state that is complementary (e.g. perpendicular, in the case of linear polarization) to the first polarization state.

In some embodiments, the first polarization state is p-polarization and the second polarization state is s-polarization.

In some embodiments, the in-coupler is configured to couple at least a first portion of a field of view and a second portion of the field of view into the waveguide, the first diffraction grating is configured to direct the first portion of the field of view along the optical path to the out-coupler, and the second diffraction grating is configured to direct the second portion of the field of view along the optical path to the out-coupler.

In some embodiments, a third diffraction grating is provided along the optical path from the in-coupler to the out-coupler, where the third diffraction grating is configured to preferentially diffract light having the first polarization state, and a fourth diffraction grating along the optical path from the in-coupler to the out-coupler, where the fourth diffraction grating is configured to preferentially diffract light having the second polarization state.

In some embodiments, the in-coupler is configured to couple at least a first portion of a field of view and a second portion of the field of view into the waveguide; the first diffraction grating and the third diffraction grating are configured to cooperatively direct the first portion of the field of view along the optical path to the out-coupler; and the second diffraction grating and the fourth diffraction grating are configured to cooperatively direct the second portion of the field of view along the optical path to the out-coupler.

In some embodiments, the first and second diffraction gratings are arranged in at least partially overlapping positions on opposite surfaces of the waveguide. In some embodiments, the third and fourth diffraction gratings are arranged in at least partially overlapping positions on opposite surfaces of the waveguide.

An apparatus according to some embodiments includes: an image generator configured to generate an image having an upper portion and a lower portion; a waveguide having an in-coupler and an out-coupler, the in-coupler being arranged to couple the upper and lower portions of the image along an optical path to the out-coupler; and along the optical path, at least a first and a second polarization-selective diffraction grating configured to cooperatively direct the upper portion of the image toward the out-coupler and at least a third and a fourth polarization-selective diffraction grating configured to cooperatively direct the lower portion of the image toward the out-coupler. One or more of the diffraction gratings may be a pupil expander.

In some embodiments, the first and second polarization-selective diffraction gratings are configured to preferentially diffract light having a first polarization, and the third and a fourth polarization-selective diffraction gratings are configured to preferentially diffract light having a second polarization substantially complementary to the first polarization.

In some embodiments, the first polarization state is p-polarization and the second polarization state is s-polarization. In other embodiments, the first polarization state is s-polarization and the second polarization state is p-polarization.

In some embodiments, the first and second diffraction gratings have a first grating period and the third and fourth diffraction gratings have a second grating period different from the first grating period.

In some embodiments, the image generator is operative to generate an image with unpolarized light.

In some embodiments, the first and second diffraction grating are on a first surface of the waveguide and the third and fourth diffraction grating are on a second surface of the waveguide opposite the first surface.

In some embodiments, the upper and lower portions of the image are partly overlapping.

An apparatus according to some embodiments includes: an image generator configured to generate an image having a left portion and a right portion, the left portion including an upper-left quadrant and a lower-left quadrant, the right portion including an upper-right quadrant and a lower-right quadrant; a waveguide having an in-coupler and an out-coupler, the in-coupler being arranged to couple the left portion of the image along a first optical path to the out-coupler and to couple the right portion of the image along a second optical path to the out-coupler; along the first optical path, at least a first and a second polarization-selective diffraction grating configured to cooperatively direct the upper-left quadrant toward the out-coupler and at least a third and a fourth polarization-selective diffraction grating configured to cooperatively direct the lower-left quadrant toward the out-coupler; and along the second optical path, at least a fifth and a sixth polarization-selective diffraction grating configured to cooperatively direct the upper-right quadrant toward the out-coupler and at least a seventh and an eighth polarization-selective diffraction grating configured to cooperatively direct the lower-right quadrant toward the out-coupler. One or more of the diffraction gratings may be a pupil expander.

In some embodiments, the first and second polarization-selective diffraction gratings are configured to preferentially diffract light having a first polarization, and the third and a fourth polarization-selective diffraction gratings are configured to preferentially diffract light having a second polarization substantially complementary to the first polarization.

In some embodiments, the fifth and sixth polarization-selective diffraction gratings are configured to preferentially diffract light having the first polarization, and the seventh and eighth polarization-selective diffraction gratings are configured to preferentially diffract light having the second polarization.

In some embodiments, the first polarization state is p-polarization and the second polarization state is s-polarization. In other embodiments, the first polarization state is s-polarization and the second polarization state is p-polarization.

In some embodiments, the first, second, fifth, and sixth diffraction gratings have a first grating period and the third, fourth, seventh, and eighth diffraction gratings have a second grating period different from the first grating period.

In some embodiments, the image generator is operative to generate an image with unpolarized light.

In some embodiments, the first, second, fifth, and sixth diffraction gratings are on a first surface of the waveguide and the third, fourth, seventh, and eighth diffraction gratings are on a second surface of the waveguide opposite the first surface.

In a method according to some embodiments, the method includes: generating an image having an upper portion and a lower portion; coupling the upper and lower portions of the image into a waveguide using an in-coupler of the waveguide; directing the upper portion of the image along an optical path from the in-coupler of the waveguide to an out-coupler of the waveguide using at least a first and a second polarization-selective diffraction grating; and directing the lower portion of the image along the optical path using at least a third and a fourth polarization-selective diffraction grating.

In some embodiments, the first and second polarization-selective diffraction gratings are configured to preferentially diffract light having a first polarization, and the third and a fourth polarization-selective diffraction gratings are configured to preferentially diffract light having a second polarization substantially complementary to the first polarization.

In some embodiments, the first polarization state is p-polarization and the second polarization state is s-polarization. In other embodiments, the first polarization state is s-polarization and the second polarization state is p-polarization.

In some embodiments, the first and second diffraction gratings have a first grating period and the second and third diffraction gratings have a second grating period different from the first grating period.

In some embodiments, generating an image comprises generating an image with unpolarized light.

Although features and elements are described above in particular combinations, one of ordinary skill in the art will appreciate that each feature or element can be used alone or in any combination with the other features and elements.

What is claimed:

1. An apparatus comprising:
    an image generator configured to generate an image;
    a waveguide having a first surface and a second surface opposite to the first surface, the waveguide having arranged on the first surface a single non-polarization-selective in-coupler, a first polarization-selective diffraction grating, a second polarization-selective diffraction grating, and a single non-polarization selective out-coupler, the waveguide having arranged on the second surface a third polarization-selective diffraction grating and a fourth polarization-selective diffraction grating;
    the single non-polarization-selective in-coupler, the first polarization-selective diffraction grating, and the second polarization-selective diffraction grating operating as a first optical path for directing light from a first part of the image according to a first polarization state to a first area of the single non-polarization-selective out-coupler, and the single non-polarization-selective in-coupler, the third polarization-selective diffraction grating and the fourth polarization-selective diffraction grating operating as a second optical path for directing light from a second part of the image according to a second polarization state to a second area of the single non-polarization-selective out-coupler.

2. The apparatus of claim 1, wherein:
    the image generator is configured to generate an image having a left portion and a right portion, the left portion including an upper-left quadrant and a lower-left quadrant, the right portion including an upper-right quadrant and a lower-right quadrant;
    wherein the single non-polarization-selective in-coupler is arranged to couple the left portion of the image along the first optical path and along the second optical path to the single non-polarization-selective out-coupler and to couple the right portion of the image along a third optical path and along a fourth optical path to the single non-polarization-selective out-coupler;
    wherein the first and second polarization-selective diffraction gratings are configured to cooperatively direct the upper-left quadrant toward the single non-polarization-selective out-coupler, and the third and fourth polarization-selective diffraction gratings are configured to cooperatively direct the lower-left quadrant toward the single non-polarization-selective out-coupler;

the apparatus further comprising:

a fifth polarization-selective diffraction grating and a sixth polarization-selective diffraction grating along the third optical path, wherein the fifth and sixth polarization-selective diffraction gratings have a greater diffraction efficiency for light having the first polarization state than for light having the second polarization state, the fifth and sixth polarization-selective diffraction gratings being configured to cooperatively direct the upper-right quadrant toward the single non-polarization-selective out-coupler; and a seventh polarization-selective diffraction grating and an eighth polarization-selective diffraction grating along the fourth optical path, wherein the seventh and eighth polarization-selective diffraction gratings have a greater diffraction efficiency for light having the second polarization state than for light having the first polarization state, the seventh and eighth polarization-selective diffraction gratings being configured to cooperatively direct the lower-right quadrant toward the single non-polarization-selective out-coupler.

3. The apparatus of claim 1, wherein the first polarization state is one of p-polarization and s-polarization and the second polarization state is the other of p-polarization and s-polarization.

4. The apparatus of claim 1, wherein the first and third diffraction gratings are arranged in at least partially overlapping positions on opposite surfaces of the waveguide.

5. The apparatus of claim 1, wherein the second and fourth diffraction gratings are arranged in at least partially overlapping positions on opposite surfaces of the waveguide.

6. The apparatus of claim 1, wherein the first and second diffraction gratings have a first grating period and the third and fourth diffraction gratings have a second grating period different from the first grating period.

7. The apparatus of claim 1, wherein the image generator is operative to generate an image with unpolarized light.

8. A method comprising:

generating an image;

coupling the image into a waveguide using a single non-polarization-selective in-coupler of the waveguide;

directing a first portion of the image along a first optical path from the single non-polarization-selective in-coupler to a single non-polarization-selective out-coupler of the waveguide using at least a first and a second polarization-selective diffraction grating, wherein the first and second polarization-selective diffraction gratings have a greater diffraction efficiency for light having a first polarization state than for light having a second polarization state complementary to the first polarization state; and directing a second portion of the image along the first optical path from the single non-polarization-selective in-coupler to the single non-polarization-selective out-coupler using at least a third and a fourth polarization-selective diffraction grating, wherein the third and fourth polarization-selective diffraction gratings have a greater diffraction efficiency for light having the second polarization state than for light having the first polarization state.

9. The method of claim 8, wherein the first portion of the image is an upper portion of the image and the second portion of the image is a lower portion of the image.

10. The method of claim 8, further comprising:

directing a third portion of the image along a third optical path from the single non-polarization-selective in-coupler to the single non-polarization-selective out-coupler using at least a fifth and a sixth polarization-selective diffraction grating, wherein the fifth and sixth polarization-selective diffraction gratings have a greater diffraction efficiency for light having the first polarization state than for light having the second polarization state; and directing a fourth portion of the image along a fourth optical path from the single non-polarization-selective in-coupler to the single non-polarization-selective out-coupler of the waveguide using at least a seventh and an eighth polarization-selective diffraction grating, wherein the seventh and eighth polarization-selective diffraction gratings have a greater diffraction efficiency for light having the second polarization state than for light having the first polarization state.

11. The method of claim 8, wherein the first polarization state is one of p-polarization and s-polarization and the second polarization state is the other of p-polarization and s-polarization.

12. The method of claim 8, wherein the first and third polarization-selective diffraction gratings are arranged in at least partially overlapping positions on opposite surfaces of the waveguide.

13. The method of claim 8, wherein the first and second polarization-selective diffraction gratings have a first grating period and the third and fourth polarization-selective diffraction gratings have a second grating period different from the first grating period.

14. The method of claim 8, wherein the image is generated with unpolarized light.

* * * * *